United States Patent
Kang et al.

(10) Patent No.: US 12,550,274 B2
(45) Date of Patent: Feb. 10, 2026

(54) ELECTRONIC DEVICE CAPABLE OF SLIDING AND FOLDING OPERATIONS

(71) Applicant: Samsung Electronics Co., Ltd., Suwon-si (KR)

(72) Inventors: Giuk Kang, Suwon-si (KR); Dongmin Shin, Suwon-si (KR); Jaehun Ko, Suwon-si (KR); Younghun Kim, Suwon-si (KR); Hongsik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 18/544,922

(22) Filed: Dec. 19, 2023

(65) Prior Publication Data

US 2024/0121907 A1    Apr. 11, 2024

Related U.S. Application Data

(63) Continuation of application No. PCT/KR2022/009062, filed on Jun. 24, 2022.

(30) Foreign Application Priority Data

Jun. 30, 2021  (KR) .................. 10-2021-0085378

(51) Int. Cl.
*H05K 5/02*  (2006.01)
*G06F 1/16*  (2006.01)

(52) U.S. Cl.
CPC ......... *H05K 5/0226* (2013.01); *G06F 1/1652* (2013.01); *G06F 1/1681* (2013.01)

(58) Field of Classification Search
CPC ... H05K 5/0226; G06F 1/1652; G06F 1/1681; G06F 1/1616; G06F 1/1624
See application file for complete search history.

(56) References Cited

U.S. PATENT DOCUMENTS 8,787,016 B2  7/2014  Rothkopf et al.
9,677,308 B1  6/2017  Chen et al.
(Continued)

FOREIGN PATENT DOCUMENTS

CN  207200775 U  4/2018
CN  110599912 A  12/2019
(Continued)

OTHER PUBLICATIONS

International Search Report for PCT/KR2022/009062 mailed Sep. 23, 2022, 4 pages.
(Continued)

*Primary Examiner* — Sagar Shrestha
(74) *Attorney, Agent, or Firm* — Nixon & Vanderhye P.C.

(57) ABSTRACT

An electronic device according to various embodiments may include: a first housing; a second housing coupled to the first housing and configured to be slidable in a first direction; a flexible display having one end fixed to one of the first housing and the second housing, and including an information display area visible from the outside of the electronic device and configured to increase and/or decrease based on sliding of the second housing; and a hinge device including a hinge rotatably connecting the second housing to the first housing, wherein a rotation shaft of the hinge device may be inserted into an accommodation part extending in the first direction such that the rotation shaft is movable in the first direction in a process in which the second housing rotates relative to the first housing.

15 Claims, 25 Drawing Sheets

(56) References Cited

U.S. PATENT DOCUMENTS

| | | | |
|---|---|---|---|
| 10,152,086 B2 | 12/2018 | Choi et al. | |
| 10,306,783 B2* | 5/2019 | Seo | H05K 5/0226 |
| 10,768,669 B2 | 9/2020 | Lian | |
| 10,820,433 B2 | 10/2020 | Cha | |
| 10,883,534 B2 | 1/2021 | Bae et al. | |
| 10,938,970 B1* | 3/2021 | Lee | H04M 1/0268 |
| 11,815,948 B2* | 11/2023 | Song | G06F 1/1652 |
| 2015/0257290 A1 | 9/2015 | Lee | |
| 2016/0062408 A1* | 3/2016 | Lee | G06F 1/1641 |
| | | | 345/173 |
| 2016/0070303 A1 | 3/2016 | Lee et al. | |
| 2016/0227645 A1* | 8/2016 | Hampton | G06F 1/1681 |
| 2016/0302314 A1 | 10/2016 | Bae et al. | |
| 2016/0366772 A1* | 12/2016 | Choi | G06F 1/1675 |
| 2019/0243424 A1* | 8/2019 | Lee | G06F 1/1679 |
| 2019/0268455 A1 | 8/2019 | Baek et al. | |
| 2020/0166974 A1* | 5/2020 | Ai | H04M 1/0216 |
| 2020/0170127 A1 | 5/2020 | Kim | |
| 2020/0249722 A1* | 8/2020 | Cha | G06F 1/1681 |
| 2020/0253069 A1* | 8/2020 | Cha | G06F 1/1616 |
| 2021/0076517 A1* | 3/2021 | Wang | H05K 5/0217 |
| 2021/0108677 A1* | 4/2021 | Bae | G06F 1/1656 |
| 2021/0109572 A1 | 4/2021 | Ou et al. | |
| 2022/0240400 A1 | 7/2022 | Zhou | |
| 2022/0286541 A1 | 9/2022 | Lee et al. | |
| 2022/0334615 A1* | 10/2022 | Kim | H04M 1/0268 |

FOREIGN PATENT DOCUMENTS

| | | |
|---|---|---|
| KR | 20160028839 A | 3/2016 |
| KR | 101784880 B1 | 10/2017 |
| KR | 20190018361 A | 2/2019 |
| KR | 20190101605 A | 9/2019 |
| KR | 20200061262 A | 6/2020 |
| KR | 20200095301 A | 8/2020 |
| KR | 20200095307 A | 8/2020 |
| KR | 102163739 B1 | 10/2020 |
| KR | 102210047 B1 | 2/2021 |
| KR | 20210064616 A | 6/2021 |

OTHER PUBLICATIONS

Written Opinion of the ISA for PCT/KR2022/009062 mailed Sep. 23, 2022, 4 pages.

* cited by examiner

ELECTRONIC DEVICE CAPABLE OF SLIDING AND FOLDING OPERATIONS

CROSS-REFERENCE TO RELATED APPLICATIONS

This application is a continuation of International Application No. PCT/KR2022/009062 designating the United States, filed on Jun. 24, 2022, in the Korean Intellectual Property Receiving Office and claiming priority to Korean Patent Application No. 10-2021-0085378, filed on Jun. 30, 2021, in the Korean Intellectual Property Office, the disclosures of each of which are incorporated by reference herein in their entireties.

BACKGROUND

Field

The disclosure relates to a slidable and foldable electronic device capable of carrying out both of sliding and folding operations.

Description of Related Art

A display may serve a key function in a portable electronic device. The display may visually display information. Factors such as the design, size, and quality of a display may play a significant role in consumers' choice of an electronic device.

Recently, with the development of display technology, flexible displays have been launched into the market. When such a flexible display is used, a display in which the size of a displayed screen is variable may also be implemented. For example, a new concept electronic device including a display which increases or decreases a screen size through sliding, is rolled around a specific mechanical structure, or is transformed through folding has also been developed.

In order to implement various electronic devices using a deformable display, a new structure capable of stably supporting the deformable display is required.

For example, when using a foldable display, a support structure capable of addressing various problems such as lifting, damage, and deformation of the display is required.

In addition, it is necessary to use a relatively simple mechanism, of which the driving characteristics do not change easily even in repeated operations.

SUMMARY

An electronic device according to various example embodiments disclosed herein may include: a first housing, a second housing coupled to the first housing to be slidable in a first direction, a flexible display having one end fixed to one of the first housing and the second housing such that an information display area, including a portion visible outside the electronic device, is configured to increase and/or decrease based on sliding of the second housing, and a hinge device including a hinge configured to rotatably connect the second housing to the first housing. A rotation shaft of the hinge device may be inserted into an accommodation portion, which extends in the first direction, to be movable in the first direction during the rotation of the second housing relative to the first housing.

According to various example embodiments disclosed herein, it is possible to create a new demand by presenting a new concept electronic device. With the use of a deformable display, it is possible to provide an electronic device capable of displaying a lot of information while being easy to carry.

By reducing damage applied to the display during deformation, it is possible to improve the durability of the display and to eliminate the lifting phenomenon of the display.

BRIEF DESCRIPTION OF THE DRAWINGS

In connection with the description of the drawings, the same or similar components may be denoted by the same or similar reference numerals. Further, the above and other aspects, features and advantages of certain embodiments of the present disclosure will be more apparent from the following detailed description, taken in conjunction with the accompanying drawings, in which.

DETAILED DESCRIPTION

Figure 1:
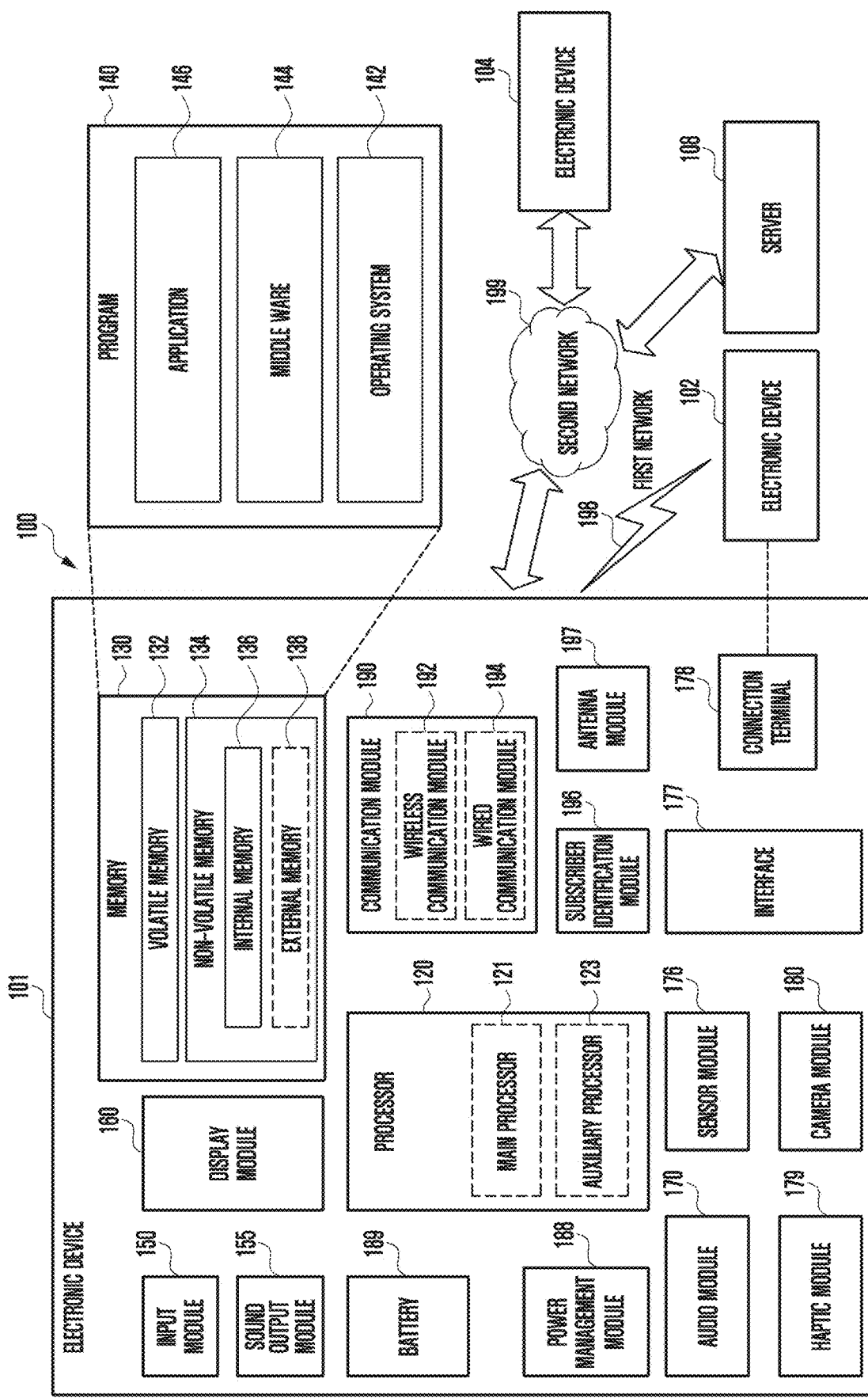
FIG. 1 is a block diagram illustrating an example electronic device in a network environment according to various embodiments.

It should be appreciated that various example embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
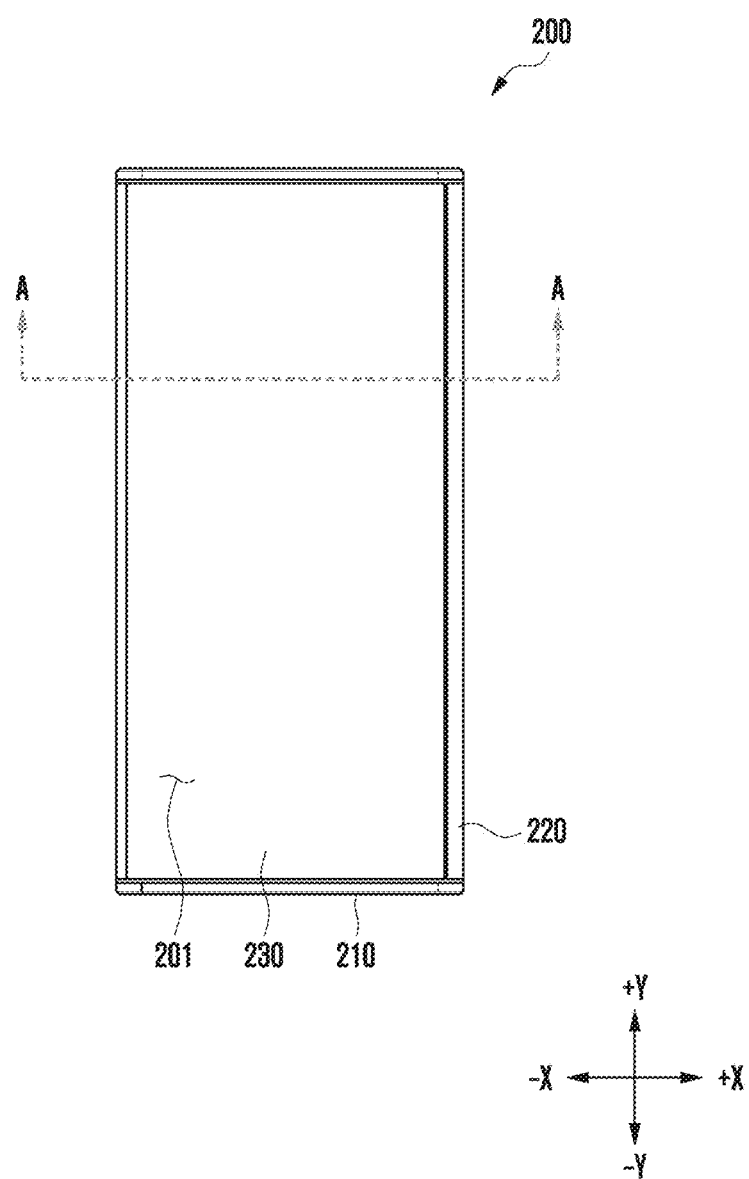
FIGS. 2A and 2B are diagrams illustrating various states of an electronic device according to various embodiments.
Figure 2B:
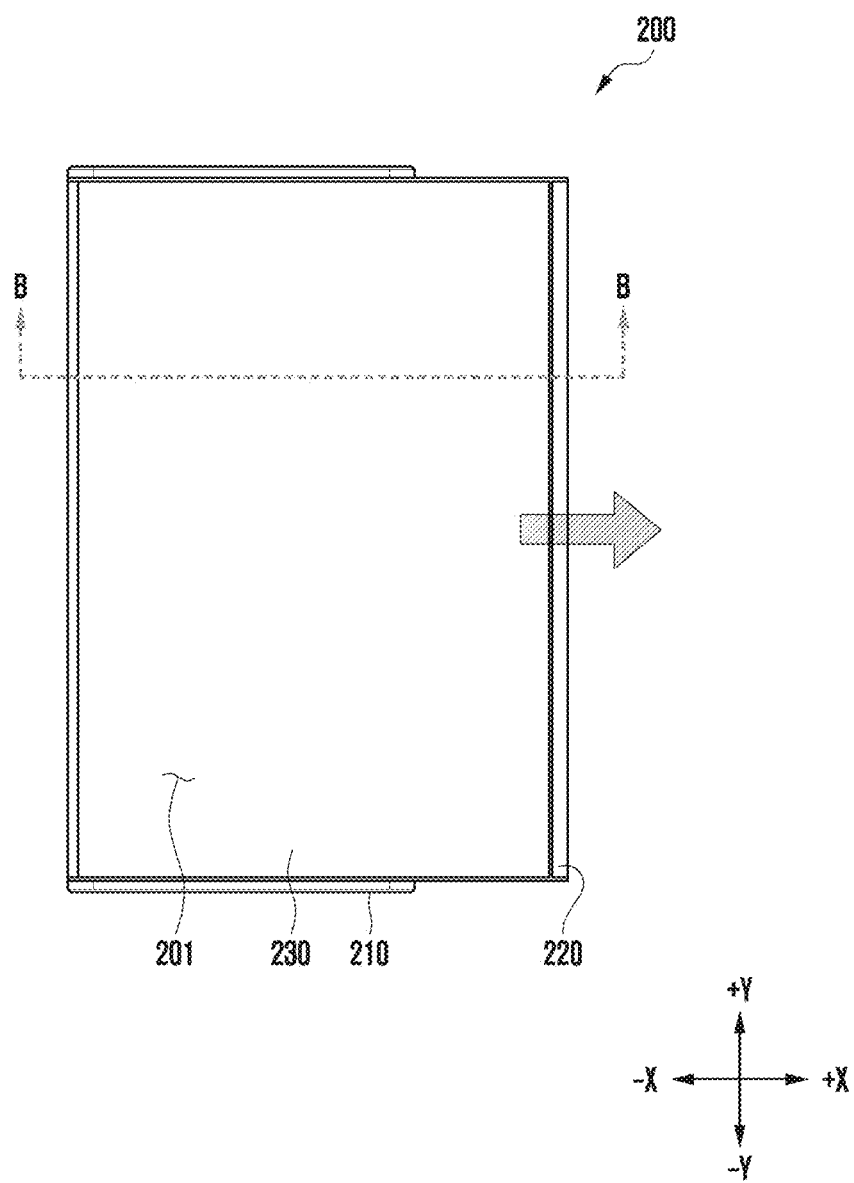

FIGS. 2A and 2B are diagrams illustrating various states of an electronic device according to various embodiments.

Figure 2C:
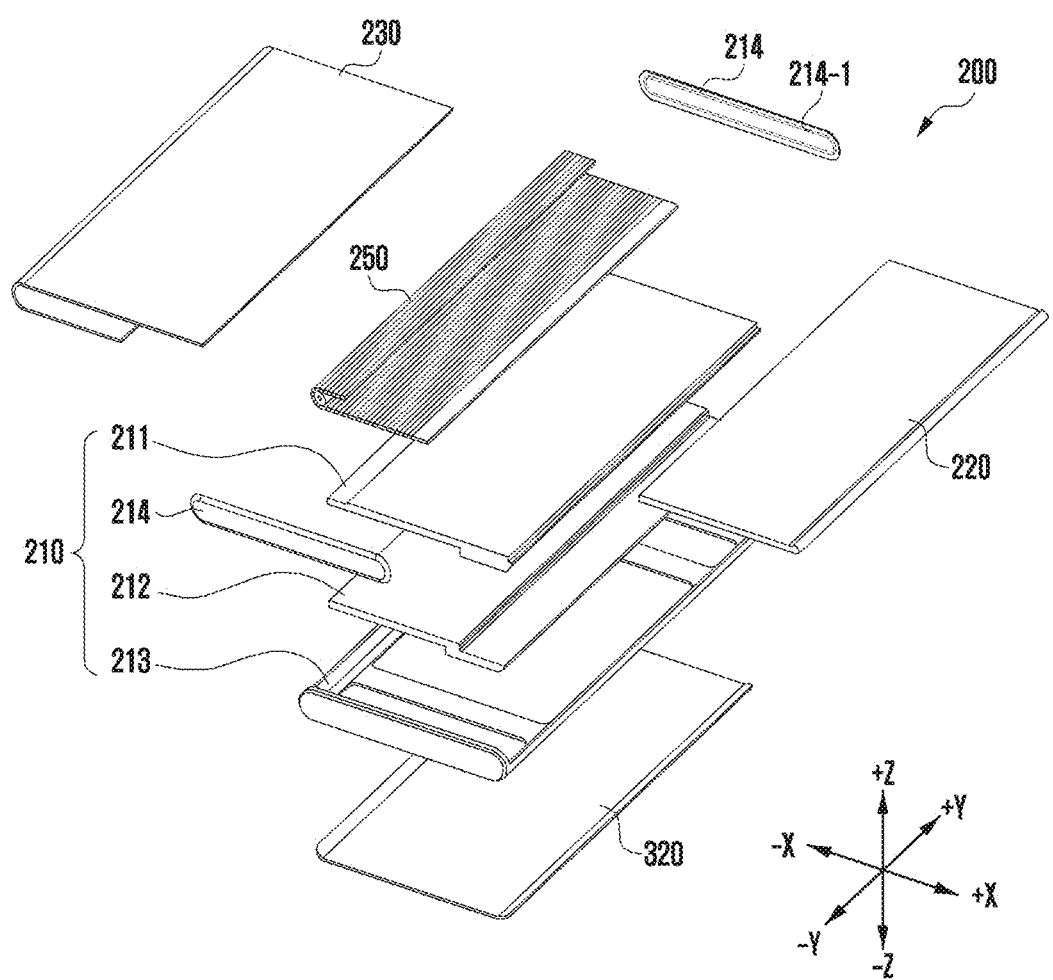
FIG. 2C is an exploded perspective view of the electronic device according to various embodiments.

FIG. 2C is an exploded perspective view of the electronic device according to various embodiments.

According to various embodiments, the electronic device 200 illustrated in FIGS. 2A, 2B and 2C may be one of the electronic devices 101 described with reference to FIG. 1.

Referring to FIGS. 2A and 2B, the electronic device 200 may be an electronic device 200 configured to increase or decrease the information display area 201 of the display 230 through a sliding method. Here, the information display area 201 may be a portion of the display 230 that is visible outside the electronic device 200. Information output on the display 230 may be visually transmitted to a user via the information display area 201.

According to various embodiments, the electronic device 200 may increase or decrease the information display area 201 by a sliding operation. In an embodiment, the sliding operation of the electronic device 200 may refer, for example, to sliding of the second housing 220 relative to the first housing 210. The second housing 220 may slide with respect to the first housing 210 in the +X direction or in the −X direction with reference to FIGS. 2A and 2B.

According to various embodiments, the electronic device 200 may be switched from a reference state (e.g., the state illustrated in FIG. 2A) to a sliding state (e.g., the state illustrated in FIG. 2B) by the sliding operation.

The reference state may refer, for example, to the state in which a distal end of the first housing 210 and a distal end of the second housing 220 are substantially coincident with each other. For example, as illustrated in FIG. 2A, the reference state may refer, for example, to the state in which the second housing 220 does not protrude from the first housing 210, or the first housing 210 does not protrude from the second housing 220. The reference state may refer, for example, to the state in which the first housing 210 and the second housing 220 are aligned with each other. The reference state may be understood as a closed state or a slide-in state.

The sliding state may refer, for example, to the state in which the second housing 220 has been slid out with respect to the first housing 210 from the reference state. In the sliding state, the information display area 201 of the display 230 may be larger than the information display area 201 of the display 230 in the reference state. The sliding state may be understood as an opened state or a slide-out state.

A display 230 in which the information display area 201 is variable depending on a sliding motion may be referred to, for example, as a "slidable display". In addition, a partial section of the display 230 may be bent by being guided by a roller (e.g., the roller 330 in FIG. 3A) to be described in greater detail below. A display 230 in which a partial area is bent by being guided by a roller may be referred, for example, to as a "rollable display". The display 230 described below may be understood as a "slidable or rollable display".

According to an embodiment, the sliding of the second housing 220 relative to the first housing 210 may be performed semi-automatically. For example, the sliding of the second housing 220 relative to the first housing 210 may be performed by a member (not illustrated) providing an elastic force in the sliding direction. In this case, when the second housing 220 is partially slid relative to the first housing 210, the second housing 220 may be slid by an elastic force applied to the first housing 210 and/or the second housing 220.

According to an embodiment, the sliding of the second housing 220 relative to the first housing 210 may be performed automatically. For example, the second housing 220 may be slid relative to the first housing 210 by a motor (not illustrated). A motor, which causes the second housing 220 to slide, may operate in response to a signal input via various buttons and sensors included in the electronic device 200.

According to various embodiments, the first housing 210 may include one or more sub-housings 211, 212, and 213 and a guide housing 214. For example, as illustrated in FIG. 2C, the first housing 210 may include a first sub-housing 211, a second sub-housing 212, a third sub-housing 213, and a guide housing 214. In an embodiment, an accommodating space (e.g., the accommodating space 310 of FIG. 3A) configured to accommodate a portion of the display 230 may be provided between the third sub-housing 213 and the second sub-housing 212. In an embodiment, a pair of guide housings 214 may be provided and may be coupled to the first sub-housing 211, the second sub-housing 211, and the third sub-housing 213 in both lateral directions of the electronic device 200 (e.g., the +Y direction and the −Y direction in FIG. 3B). The guide housing 214 may include a guide rail 214-1. The guide rail 214-1 may be a groove provided in the guide housing 214 to guide the sliding motions of the second housing 220 and the support member 250. When the provided on the second housing 220 and the support member 250 are slid while being inserted into the guide rail 214-1, the guide rail 214-1 is capable of guiding the sliding of the second housing 220 and the support member 250.

According to various embodiments, the second housing 220 may support a portion of the display 230. At least a portion of the display 230 may be fixed to the second housing 220 and may move along the second housing 220 when the second housing 220 slides relative to the first housing 210.

According to various embodiments, the support member 250 may support a portion of the display 230. The support member 250 may include a bendable structure. For example, the support member 250 may include a structure in which multiple bars (e.g., the first support member 410 in FIGS. 4A, 4B, 4C and 4D) extending in a direction (e.g., the Y-axis direction in FIG. 3B) perpendicular to the sliding direction (e.g., the X-axis direction in FIG. 3B) are arranged along the sliding direction. In addition, the support member 250 may be configured in various other bendable structures. For example, the support member 250 may be a bendable plate or may have a structure in which multiple grooves are formed to allow bending. The support member 250 may be connected to the second housing 220 and may slide with respect to the first housing 210 together with the second housing 220.

According to various embodiments, the display 230 may be a flexible display 230 which is bendable. In an embodiment, the display 230 may include a substrate made of a flexible material. For example, the display 230 may include a substrate made of a flexible polymer material such as polyimide (PI) or polyethylene terephthalate (PET). In addition, the display 230 may include a very thin substrate made of a glass material. The display 230 is supported by the second housing 220 and the support member 250, and the information display area 201, which is a portion visible outside the electronic device, may increase or decrease through the sliding of the second housing 220 relative to the first housing 210. In an embodiment, the display 230 may further include a touch sensing circuit (e.g., a touch sensor). In addition, the display 230 may be coupled to or disposed adjacent to a pressure sensor capable of measuring the intensity (pressure) of a touch, and/or a digitizer configured to detect a magnetic field-type pen input device (e.g., a stylus pen). For example, the digitizer may include a coil member disposed on a dielectric substrate to detect an electromagnetically induced resonance frequency applied from a pen input device.

According to various embodiments, the rear surface cover 320 may be coupled to the first housing 210 to define the exterior of the rear surface of the electronic device 200. For example, as illustrated in FIG. 3B, the rear surface cover 320 may be coupled to the first housing 210 in the Z-axis direction of FIG. 3B. The rear surface cover 320 may be made of a transparent, opaque, or translucent material.

Figure 3A:
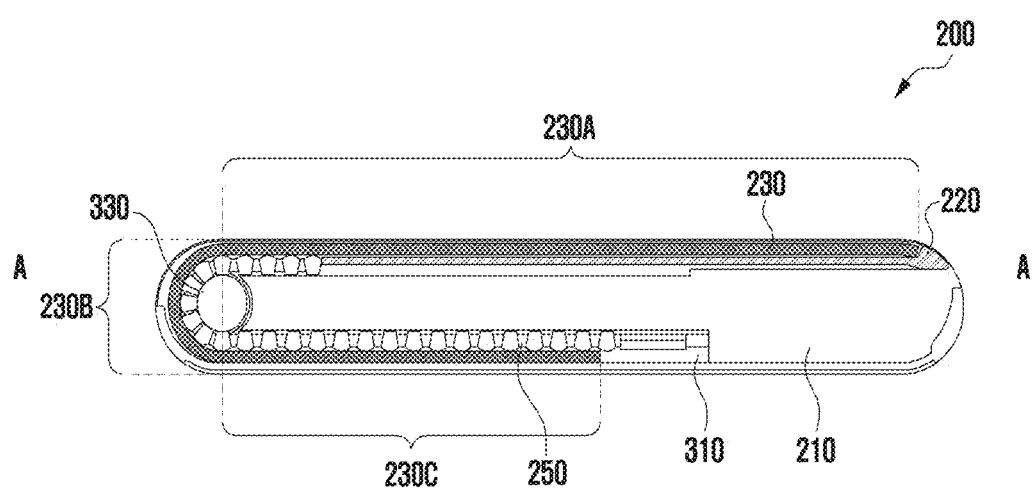
FIG. 3A is a cross-sectional view taken along line A-A of the electronic device illustrated in FIG. 2A, according to various embodiments.
Figure 3A:
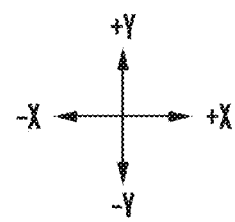
Figure 3B:
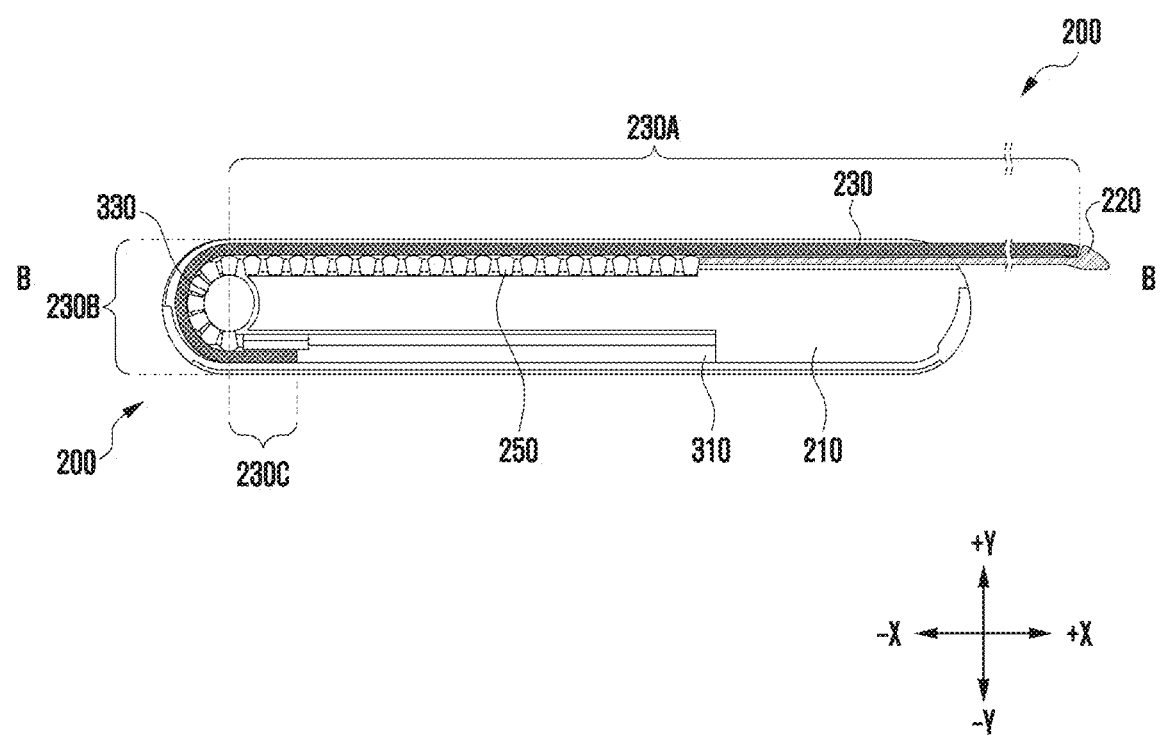
FIG. 3B is a cross-sectional view taken along line B-B of the electronic device illustrated in FIG. 2B, according to various embodiments.

FIG. 3A is a cross-sectional view taken along line A-A of the electronic device illustrated in FIG. 2A, according to various embodiments. FIG. 3B is a cross-sectional view taken along line B-B of the electronic device illustrated in FIG. 2B, according to various embodiments.

According to various embodiments, the display 230 may include a plurality of areas. Multiple areas to be described below may be areas divided depending on the state of the display 230 or the portion where the display 230 is located in the electronic device 200. For example, the display 230 may include a display area 230A, which is an area where the display 230 is exposed outside the electronic device 200, a stored area 230C, which is an area stored inside the electronic device 200, and a bending area 230B which interconnects the display area 230A and the stored area 230C and is bent. In an embodiment, the stored area 230C of the display 230 may be an area where a portion of the display 230 is accommodated in the accommodating space 310 included in the first housing 210. In an embodiment, depending on the shape of the housing surrounding the display 230, a portion of the bending area 230C may also be visible outside the electronic device 200.

According to the sliding of the second housing 200, the sizes of the display area 230A and the stored area 230C may be variable. For example, the size of the display area 230A in the reference state (e.g., the state illustrated in FIG. 3A) may be smaller than the size of the display area 230A in the sliding state (e.g., the state illustrated in FIG. 3B). The size of the stored area 230C in the reference state may be larger than the size of the stored area 230C in the sliding state. Each area of the display 230 is only divided for convenience of description and may not be an actually visually distinct area.

According to various embodiments, when the second housing 220 is slid in the +X direction with reference to FIGS. 3A and 3B, the display area 230A may increase and the stored area 230C may decrease while the display 230 connected to the second housing 220 moves. The support member 470, which supports the display 230, may be bent along the roller 330 in the bending area 230B.

Figure 4A:
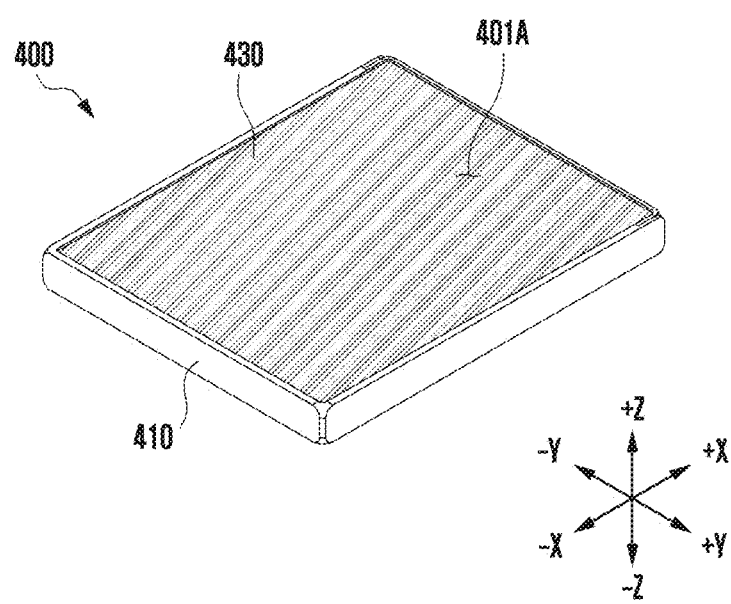
FIG. 4A is a perspective view of an electronic device according to various embodiments.
Figure 4B:
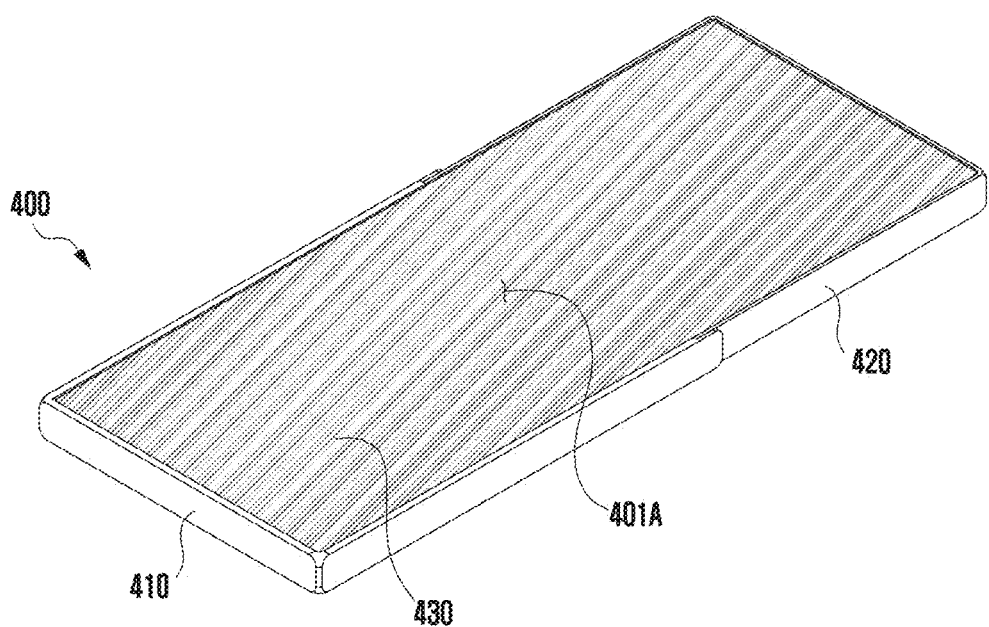
FIG. 4B is a perspective view of the electronic device illustrated in FIG. 4A in a slide out state according to various embodiments.
Figure 4C:
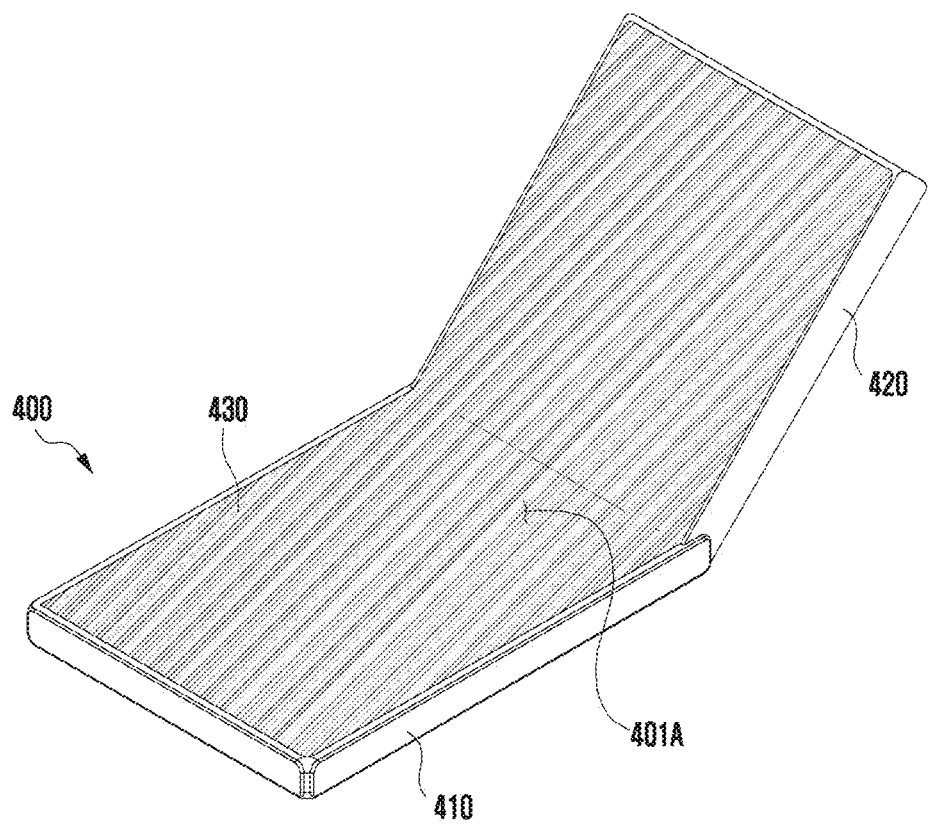
FIG. 4C is a perspective view of the electronic device illustrated in FIG. 4B in a partially folded state according to various embodiments.
Figure 4D:
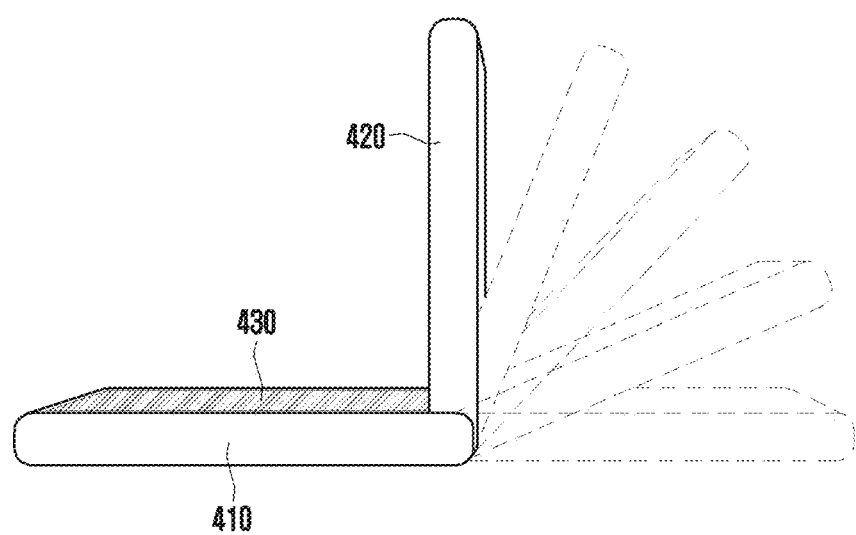
FIG. 4D is a diagram illustrating a side view illustrating a folding operation of an electronic device according to various embodiments.

FIG. 4A is a perspective view of an electronic device according to various embodiments. FIG. 4B is a perspective view of the electronic device illustrated in FIG. 4A in a sliding-completed state according to various embodiments. FIG. 4C is a perspective view of the electronic device illustrated in FIG. 4B in a partially folded state according to various embodiments. FIG. 4D is a diagram illustrating a side view illustrating a folding operation of an electronic device according to various embodiments.

The electronic device 400 described below may include a first housing 410 (e.g., the first housing 210 in FIG. 2A) and a second housing 420 (e.g., the second housing 220 in FIG. 2A) which are coupled to be slidable as in the electronic device 200 described with reference to FIGS. 2A, 2B and 2C and FIGS. 3A and 3B, wherein an information display area 401A (e.g., the information display area 201 in FIG. 2A) of a display 430 (e.g., the display 230 of FIG. 2A) is variable depending on the sliding of the second housing 420. The operation and structure of the electronic device 400 to be described below may be understood by referring to the above description since the electronic device 400 includes components similar to those of the above-described electronic device 200.

As illustrated in FIGS. 4A and 4B, when the second housing 420 slides with respect to the first housing 410, the area of the portion in which information is displayed (the information display area 401A) or the portion of the display 430 that is visible outside the electronic device 400 may increase. Hereinafter, the sliding in the direction in which the information display area 401A is extended is referred to as "sliding in the first direction (e.g., the +X direction of FIG. 4B)". Sliding in a second direction opposite to the first direction (e.g., the −X direction in FIG. 4B) may be sliding in a direction in which the information display area 401A is reduced. The sliding in a direction in which the information display area 401A is reduced may be referred to as "sliding in a second direction".

In the electronic device 400 to be described below, the second housing 420 may be configured to rotate with respect to the first housing 410. When the second housing 420 rotates with respect to the first housing 410, a partial area of the display 430 may be deformed (e.g., bent). As illustrated in FIGS. 4C and 4D, depending on the rotation of the second housing 420 relative to the first housing 410, the area of the display 430 disposed on the first housing 410 and the area of the display 430 disposed on the second housing 420 may form a predetermined angle. The rotation of the second housing 420 relative to the first housing 410 may be understood as folding of the first housing 410 and the second housing 420.

Therefore, the electronic device 400 to be described below may refer, for example, to an electronic device 400 which is foldable while being slidable or rollable.

Referring to FIG. 4D, the second housing 420 and the first housing 410 may form various angles therebetween. In an embodiment, the rotation of the first housing 410 relative to the second housing 420 may be stopped in a state in which no external force is applied. For example, due to the frictional force in components that rotatably connect the first housing 410 and the second housing 420 (e.g., the hinge device 500 in FIG. 5A) to each other, the rotation of the second housing 420 relative to the first housing 410 may stop.

In a state in which the second housing 420 forms a predetermined (e.g., specified) angle with respect to the first housing 410, the first housing 410 may functions as a support for supporting the second housing 420 at a predetermined angle with respect to a floor surface. In this state, information may be displayed on the display 430 disposed on the second housing 420. A selfie may be taken using a camera (e.g., the camera module 180 in FIG. 1) disposed on the front surface of the second housing 420, notifications may be displayed, or a manipulation UI may be displayed on the display 430 disposed on the first housing while content (e.g., a game or a video image) is displayed on the display 430 disposed in the second housing 420. In addition, the electronic device 400 disclosed herein may be utilized in various ways.

Figure 5A:
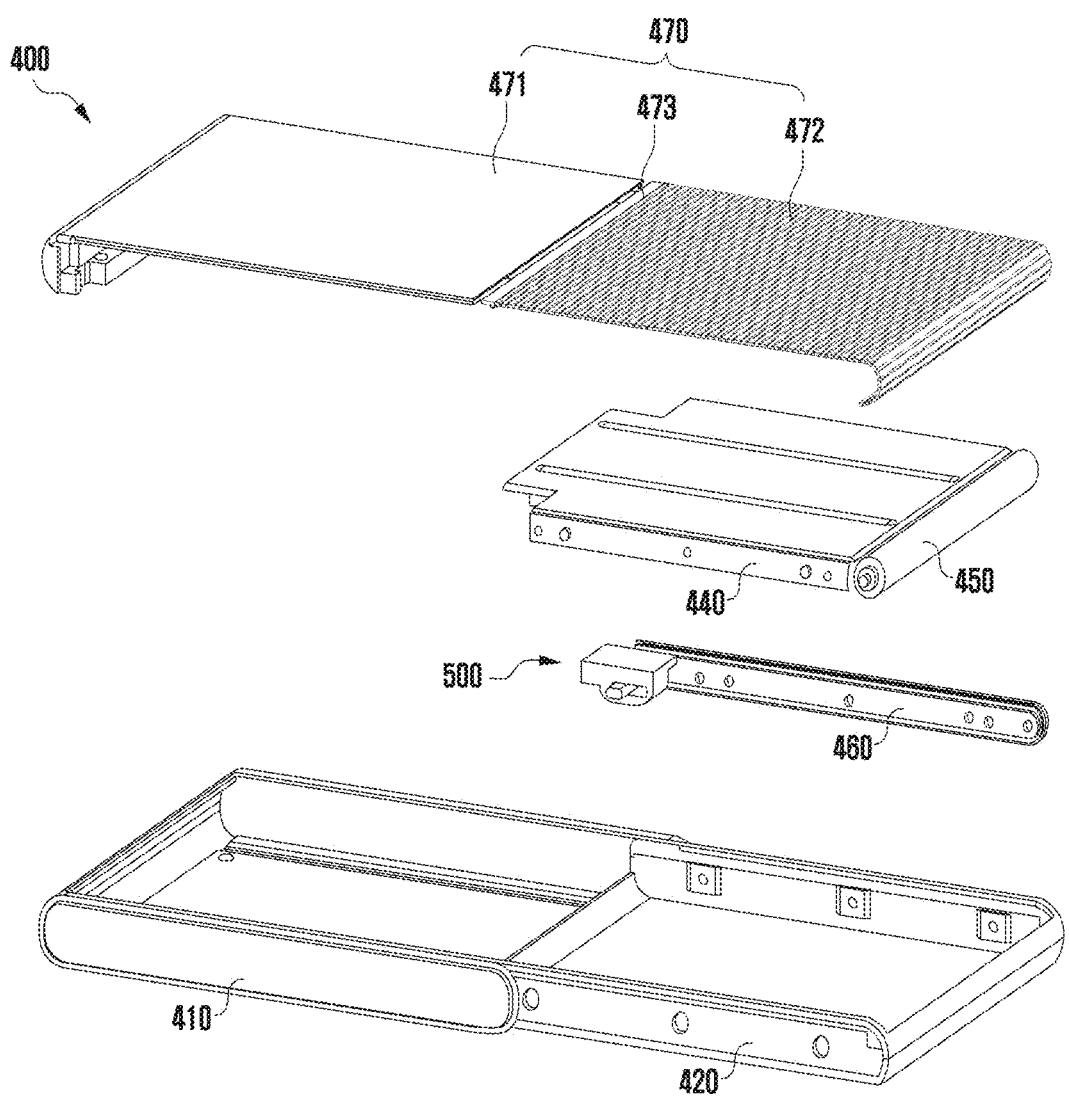
FIG. 5A is an exploded perspective view of an electronic device according to various embodiments.
Figure 5B:
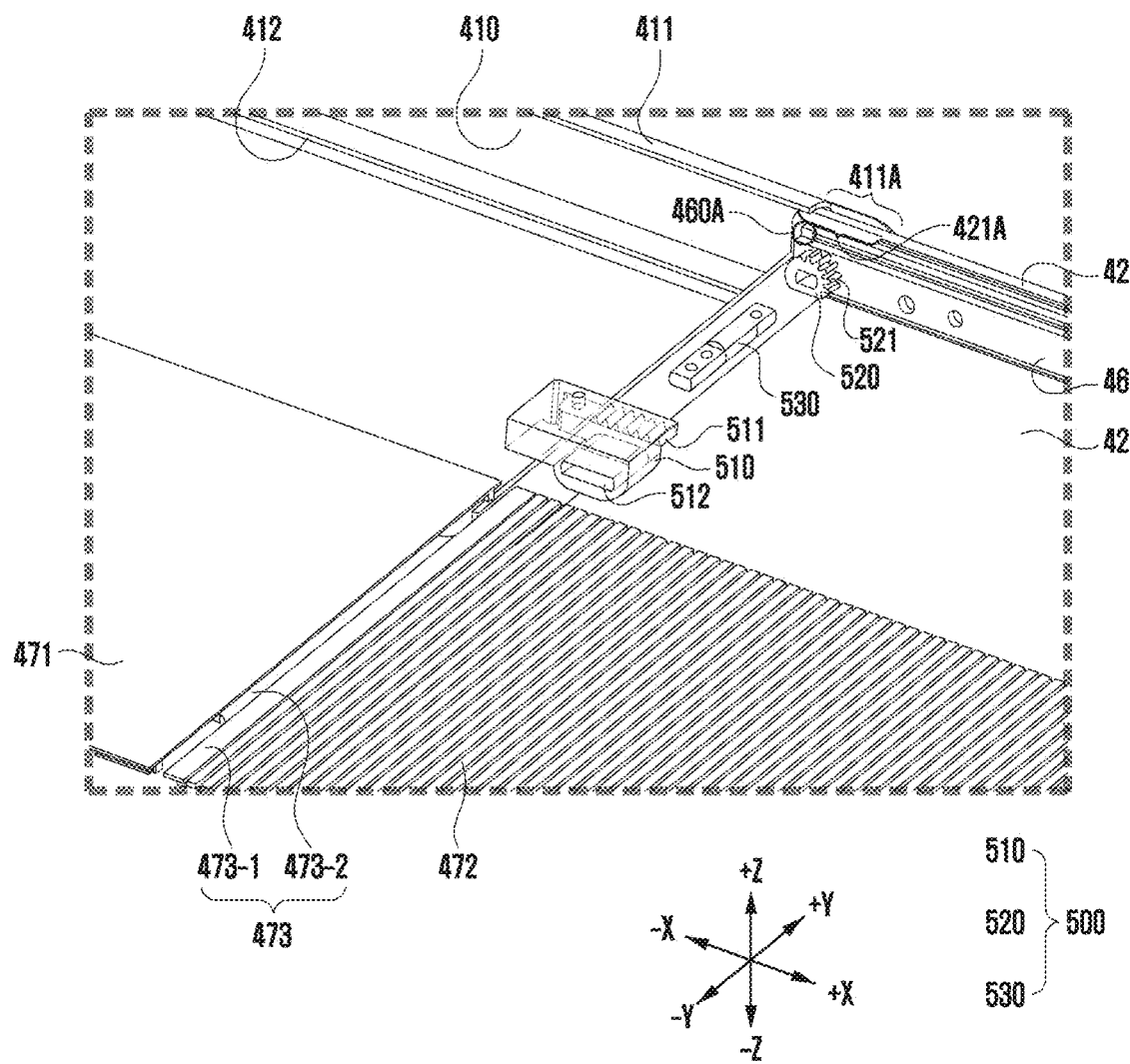
FIG. 5B is a partial perspective view illustrating various components of the electronic device according to various embodiments.

FIG. 5A is an exploded perspective view of an electronic device according to various embodiments. FIG. 5B is a partial perspective view separately illustrating various components of the electronic device according to various embodiments. FIGS. 6A, 6B, 6C, 6D and 6E are various views illustrating sliding and folding operations of the electronic device according to various embodiments.

Referring to FIGS. 5A and 5B, an electronic device may include a first housing 410, a second housing 420, a sub-housing 440, a guide rail 460, a roller 450, a hinge device 500, and a support member (e.g., support) 470. The second housing 420 may be slidably coupled to the first housing 410. The sub-housing 440 may be coupled to the second housing 420 to support the support member 470. In addition, a portion of a display (e.g., the display 430 in FIG. 4A) may be stored in a storage space defined between the sub-housing 440 and the second housing 420. The guide rail 460 may guide the movement of the support member 470 while the second housing 420 is sliding with respect to the first housing 410. As illustrated in FIG. 5A, the guide rail 460 may be separately configured and disposed on a side surface of the sub-housing 440 or an inner side surface of the second housing 420. In various embodiments, the guide rail 460 may be configured on a side surface of the sub-housing 440 or an inner surface of the second housing 420. The roller 450 may support the support member 470 supporting the bending area of the display 430 (e.g., the bending area 430B in FIG. 6A). The hinge device 500 may be a component that implements the rotation of the first housing 410 relative to the second housing 420. The second housing 420 may rotate with respect to the first housing 410 by the hinge device 500. The support member 470 may support the display 430. A more detailed description of each component will be added while describing the operation of the electronic device.

First, the sliding operation of the electronic device 400 will be described with reference to FIGS. 5A and 5B and FIGS. 6A, 6B and 6C. The sliding motion of the electronic device 400 may be similar to that of the electronic device 200 described with reference to FIGS. 2A, 2B and 2C and FIGS. 3A and 3B.

Hereinafter, the state illustrated in FIG. 6A will be referred to as a slide-in state, and the state illustrated in FIG. 6C will be referred to as a slide-out state.

The display 430 included in the electronic device 400 according to various embodiments disclosed herein may be a flexible display 430 in which a partial section is deformable (e.g., bendable) depending on the sliding motion of the electronic device 400. The display 430 may include multiple areas. Here, the multiple areas of the display 430 are divided for convenience of description, and do not require that the display 430 is implemented by being segmented into multiple areas or includes multiple areas that are visually separated. In an embodiment, the display 430 may include a display area 430A, a bending area 430B, and a stored area 430C. The display area 430A may refer, for example, to an area where the display 430 is visible outside the electronic device 400. The stored area 430C may be an area stored in the internal space of the electronic device 400. The internal space of the electronic device 400 in which the stored area 430C of the display 430 is disposed may be a space defined by the second housing 420 and the sub-housing 440 coupled to the second housing 420. The bending area 430B may be an area that interconnects the display area 430A and the stored area 430C. Deformation of the display 430 may occur in the bending area 430B. In some cases, a portion of the bending area 430B may also be visible outside the electronic device 400. Accordingly, an area of the bending area 430B may also become the display area 430A. The display area 430A of the display 430 may be further divided into a first area 431A, a second area 432A, and a third area 433A. The first to third areas 431A to 433A may be conceptually divided by the support member 470 supporting the display 430.

According to various embodiments, the display 430 may be supported by the support member 470. The support member 470 may include a first support portion 471, a second support portion 472, and a third support portion 473.

In an embodiment, each of opposite ends of the support member 470 may be inserted into the guide rail 460. Each of opposite ends of the display 430 coupled to the support member 470 may be disposed between the guide rail 460 and a second guide rib 421. Referring to FIG. 5B, the second guide rib 421, which is a portion protruding inward of the second housing 420, may be provided on an inner side surface of the second housing 420. The second guide rib 421 may cover a portion of the display 430. Since the second guide rib 421 covers a portion of the display 430, the display 430 may not be separated during sliding.

In an embodiment, the first support portion 471 may support a portion of the display 430 where deformation does not occur. The portion of the display 430 where deformation does not occur may be the first area 431A of the display area 430A. The first area 431A may be an area where deformation does not occur in the course of sliding the second housing 420. The first support portion 471 may have a plate shape. The first area 431A of the display 430 and the first support portion 471 may be fixed via a fixing member (not illustrated). For example, the fixing member may be an adhesive material. The first area 431A of the display 430 and the first support portion 471 may be fixed to each other by the fixing member. In an embodiment, the first support portion 471 may be fixed to the first housing 410. Since the first area 431A is fixed to the first support portion 471 and the first support portion 471 is fixed to the first housing 410, the first area 431A may be fixed to the first housing 410. In an embodiment, the first support portion 471 may be inserted into the guide rail 460. For example, as illustrated in FIGS. 6A and 6B, in the slide-in state or an intermediate state between the slide-in state and the slide-out state, the first support portion 471 may be inserted into the guide rail 460.

In an embodiment, the second support portion 472 may support the second area 432A, the bending area 430B, and the stored area 430C of the display area 430A. The area of the display 430 supported by the second support portion 472 may be a portion where deformation occurs in the course of sliding the second housing 420. The second support portion 472 may be configured to be bendable so as to support the area of the display 430 where deformation occurs. For example, the second support portion 472 may include multiple bars which extend in the width direction of the display 430 (e.g., the Y-axis direction in FIG. 5B) and is arranged in the length direction of the display 430 (e.g., the X-axis direction in FIG. 5B). The width direction of the display 430 and the length direction of the display 430 may be perpendicular to each other. Each of the multiple bars may be fixed to the display 430 via a fixing member (not illustrated). For example, the fixing member may be an adhesive material. The movement of the second support portion 472 may be guided by the guide rail 460. The guide rail 460 may extend in the sliding direction of the second housing 420 (e.g., a first direction (e.g., the +X direction in FIG. 6A) or a second direction (e.g., the −X direction in FIG. 6A)). In addition, a partial section of the guide rail 460 may be bent to extend into the storage space. The second support portion 472 guided to the portion where the guide rail 460 is bent may support the bending area 430B of the display 430. Since the display 430 is supported by the second support portion 472 guided by the guide rail 460 which is bent to extend, the display 430 may be bent. Since the guide rail 460 extends into the storage space and the second support portion 472 guided by the guide rail 460 supports the display 430, the display 430 may be moved out of the storage space. In an embodiment, the guide rail 460 may be disposed on each of opposite side surfaces of the second housing 420.

In an embodiment, the third support portion 473 may be disposed between the first support portion 471 and the second support portion 472 to support a portion of the third area 433A of the display area 430A of the display 430. The third area 433A of the display area 430A may be an area that interconnects the first area 431A and the second area 432A. A detailed description of the third supporter 473 will be provided in the section describing the folding operation of the electronic device 400.

Figure 6A:
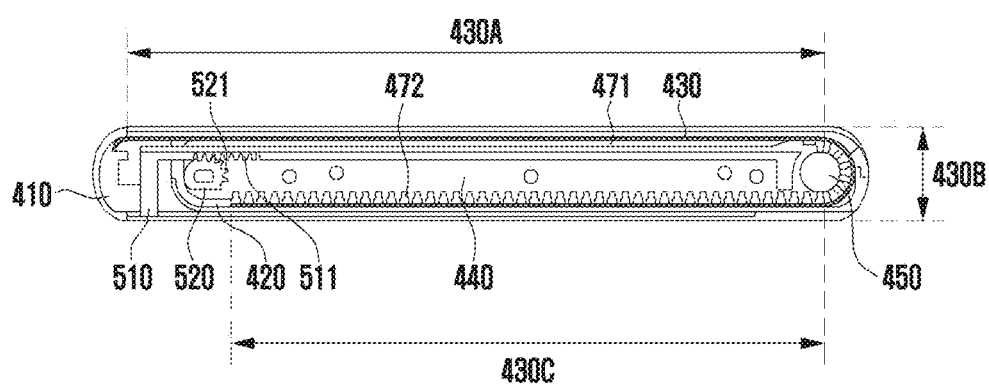
FIGS. 6A, 6B, 6C, 6D and 6E are various views illustrating sliding and folding operations of the electronic device according to various embodiments.
Figure 6A:
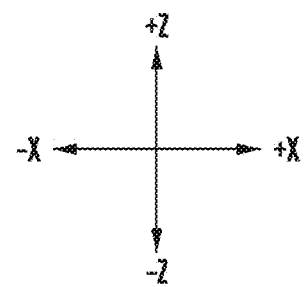
Figure 6B:
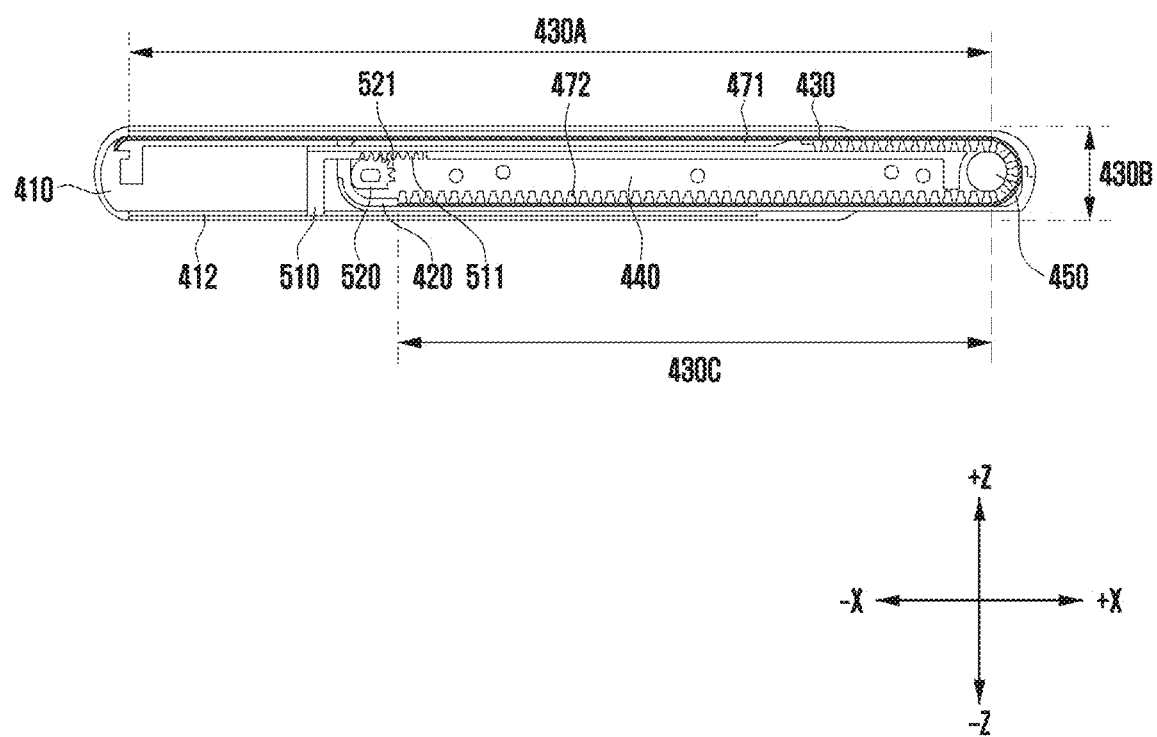
Figure 6C:
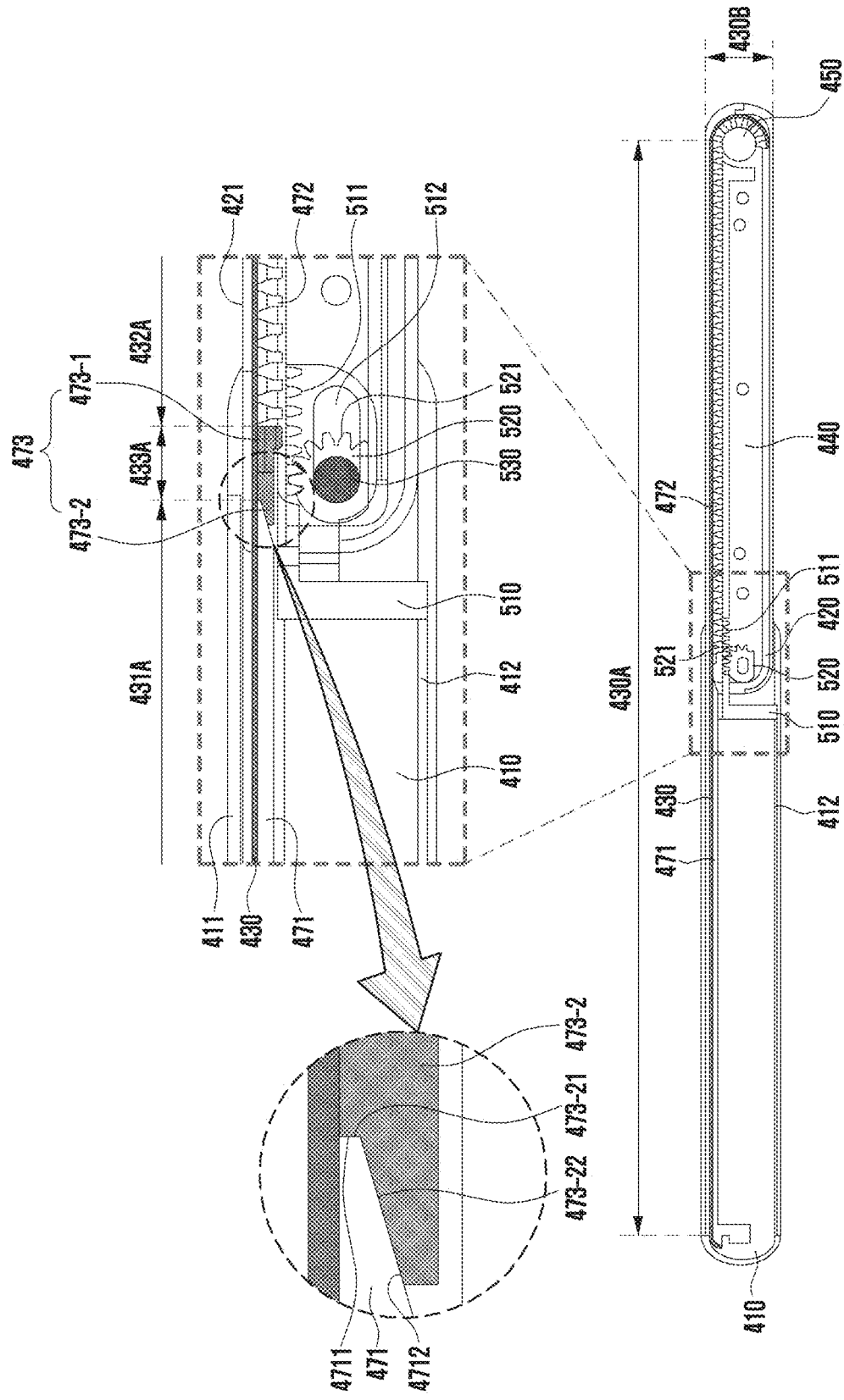

As illustrated in FIGS. 6A, 6B and 6C, when the second housing 420 slides relative to the first housing 410 in the first direction, a portion of the display 430 stored in the storage space may be moved out of the storage space to be visible outside the electronic device 400. In other words, the display area 430A of the display 430 may increase, and the stored area 430C of the display 430 may decrease. In this process, the second support portion 472 guided by the guide rail 460 may support the bending area 430B of the display 430 in a bendable manner by the shape of the guide rail 460. In addition, the second support portion 472 supporting the bending area 430B may be supported by the roller 450. Since the display 430 and the second support portion 472 are fixed to each other, the display 430 and the second support portion 472 may be moved together. Sliding of the second housing 420 in the first direction may be restricted by, for example, a structure of a separate mechanism (e.g., an engagement structure between the hinge device 500 and the hinge guide 412). Hereinafter, the state in which the second housing 420 is slid to a limit position (e.g., the state illustrated in FIG. 6C) will be referred to as a "folding start state". The folding start state will be described later.

As illustrated in FIGS. 6A, 6B and 6C, when the second housing 420 slides relative to the first housing 410 in the second direction, the display area 430A may be decreased and the stored area 430C may be increased. In other words, by the sliding of the second housing 420 in the second direction, one area of the display 430, which has corresponded to the display area 430A, may become the bending area 430B and may move to the storage space to become the stored area 430C. The deformation and movement of the display 430 may be performed depending on the movement of the second support portion 472 fixed to the display 430.

Next, the folding operation of the electronic device 400 will be described with reference to FIGS. 5A and 5B and FIGS. 6C, 6D and 6E. The folding operation of the electronic device 400 may be implemented by the hinge device 500 included in the electronic device 400. First, an operation when the second housing 420 rotates with respect to the first housing 410 in the first rotation direction will be described. The first rotation direction may refer, for example, to a rotation direction in which the first housing 410 and the second housing 420 are folded.

Referring to FIG. 5B, the hinge device 500 may include a first hinge 510 and a second hinge 520. In an embodiment, multiple hinge devices 500 may be provided. Although a hinge device 500 is illustrated as being disposed adjacent to one side surface of the second housing 420 in FIG. 5B, a hinge device 500 may also be disposed adjacent to the other side surface. In the hinge device 500, the second hinge 520 may be installed to be rotatable with respect to the first hinge 510. An accommodation portion 512 into which the rotation shaft 530 of the hinge device 500 is inserted may be provided in the first hinge 510. During the folding of the electronic device 400 according to various embodiments disclosed herein, the rotation shaft 530 may move in the sliding direction of the second housing 420 (e.g., the first direction or the second direction). The accommodation portion 512, which accommodates the rotation shaft 530, may also extend in the first direction or the second direction to accommodate the rotation shaft 530 moving in the sliding direction. The rotation shaft 530 inserted into the accommodation portion 512 may move in the sliding direction.

In an embodiment, the first gear 511 provided on the first hinge 510 and the second gear 521 provided on the second hinge 520 may be meshed to be capable of interlocking with each other. The first gear 511 may be configured integrally with the first hinge 510 or may be configured separately from the first hinge 510 and coupled to the first hinge 510. The second gear 521 may be configured integrally with the second hinge 520 or may be configured separately from the second hinge 520 and coupled to the second hinge 520.

In an embodiment, the first gear 511 and the second gear 521 may be configured such that the rotation of the second hinge 520 and the linear movement of the second hinge 520 relative to the first hinge 510 occur at the same time. In other words, the first gear 511 and the second gear 521 may be configured to allow the second hinge 520 to rotate with respect to the first hinge 510 while the rotation shaft 530 of the second hinge 520 linearly moves. For example, one of the first gear 511 and the second gear 521 may be a gear extending in the first direction or the second direction. As illustrated in FIGS. 5B and 6C, the first gear 511 of the first hinge 510 may extend in the first direction or the second direction. The second gear 521 of the second hinge 520 may be meshed with the first gear 511 and at least a portion of the second gear 521 may be configured in a circular shape. For example, the first gear 511 and the second gear 521 may be rack and pinion gears. The first gear 511 may be a rack gear, and the second gear 521 may be a pinion gear. Due to the above-described shapes of the first gear 511 and the second gear 521, while the second hinge 520 rotates with respect to the first hinge 510, the second hinge 520 may linearly move with respect to the first hinge 510 to allow the rotation shaft 530 connected to the second hinge part 520 to move in the accommodation portion 512.

In an embodiment, the hinge device 500 may move with respect to the first housing 410 together with the second housing 420 to follow the sliding of the second housing 420. The hinge device 500 may move together with the second housing 420 through various connective relationships therebetween. For example, the second hinge 520 may be fixed to the second housing 420 by being configured on the guide rail 460 coupled to the second housing 420 or being coupled to the guide rail 460. Since the first gear 511 of the first hinge 510 and the second gear 521 of the second hinge 520 are in the state of being meshed with each other, when the second hinge 520 moves along the second housing 420, the first hinge 510 may also move along the second housing 420. In an embodiment, the movement of the first hinge 510 may be guided by the hinge guide 412 provided in the first housing 410. The hinge guide 412 may extend in the first direction or the second direction. For example, the movement of the first hinge 510 may be restricted by the hinge guide 412. When the movement of the first hinge 510 is restricted by the hinge guide 412, the movement of the second hinge 520 meshed with the first hinge 510 is stopped, and the sliding of the second hinge 520 fixed to the second housing 420 may be stopped. The state of the electronic device 400 at the point where the movement of the first hinge 510 is restricted by the hinge guide 412 may be understood as a folding start state. For example, in the electronic device 400 illustrated in FIG. 6C, since the movement of the first hinge 510 is restricted by the hinge guide 412, it may be understood that the electronic device 400 illustrated in FIG. 6C is in the folding start state.

In an embodiment, the rotation of the second housing 420 relative to the first housing 410 may be possible when the electronic device 400 reaches the folding start state.

Figure 6D:
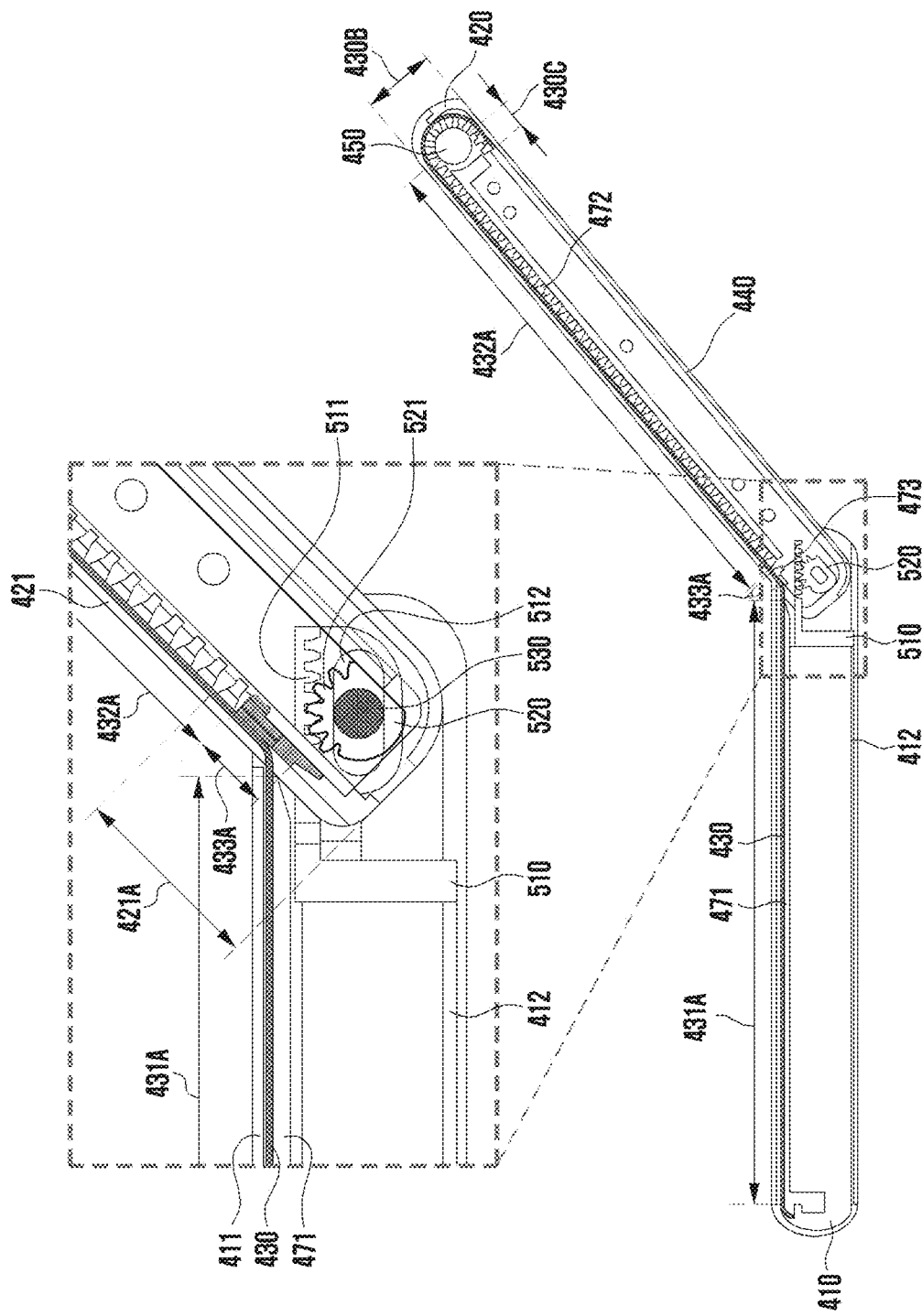

For example, as illustrated in FIGS. 6C and 6D, the second housing 420 may rotate with respect to the first housing 420 after the second housing 420 slides with respect to the first housing 410 by a predetermined distance. An engagement structure may be provided in the first housing 410 and the second housing 420. For example, referring to FIG. 5B, a first guide rib 411, which is a portion protruding inward of the first housing 410, may be provided on an inner side surface of the first housing 410. Referring to FIG. 5B, a second guide rib 421, which is a portion protruding toward the inside of the second housing 420, may be provided on an inner surface of the second housing 420. In the state in which the second housing 420 does not sufficiently slide in the first direction with respect to the first housing 410, the first guide rib 411 and the second guide rib 421 may overlap each other. In other words, the first guide rib 411 may cover at least a portion of the second guide rib 421. Due to the engagement structure between the first guide rib 411 and the second guide rib 421 in the state where the first guide rib 411 and the second guide rib 421 overlap each other, the second housing 420 may not be able to rotate with respect to the housing 410. When the second housing 420 slides by a predetermined distance in the first direction with respect to the first housing 410 and the electronic device 400 reaches the folding start state, as illustrated in FIG. 5B, the second guide rib 421 may be disposed in the portion 411A where the first rib 411 is not provided. In this state, since the first guide rib 411 and the second guide rib 421 do not overlap each other, there is no engagement between the first guide rib 411 and the second guide rib 421, and the second housing 420 is rotatable with respect to the housing 410.

In the foregoing, it has been described that the engagement structure is provided between the first housing 410 and the second housing 420, but an engagement structure may not exist between the first housing 410 and the second housing 420 which are disposed to be movable relative to each other. In this case, even if the electronic device 400 does not reach the folding start state, the second housing 420 may be folded relative to the first housing 410.

In an embodiment, referring to FIGS. 5B and 6D, the second guide rib 421 provided in the second housing 420 may support the display 430. Since the second guide rib 421 supports the display 430 in the folded state, lifting of the display 430 may be alleviated. In addition, the second housing 420 may include a section 421A where the second guide rib 421 is not provided. The display 430 may be deformed in the course of folding. When the second guide rib 421 exists at a point where deformation occurs, interference may occur between the second guide rib 421 and the display 430. Therefore, the second guide rib 421 may not exist in the portion 421A corresponding to the portion where the deformation of the display 430 occurs in the course of folding.

Referring to FIGS. 6C and 6D, when the second hinge 520 rotates with respect to the first hinge 510 in the course of folding, the second housing 420 may rotate with respect to the first housing 410. In addition, when the second hinge 520 rotates with respect to the first hinge 510, the second hinge 520 and the rotation shaft 530 connected to the second hinge 520 may move in the first direction. A portion of the display area 430A may be deformed in the course of folding. For example, deformation may start at a portion between the first support portion 471 and the third support portion 473.

In an embodiment, the third support portion 473, which supports the third area 433A of the support member 470, may include a first sub-support portion 473-1 and a second sub-support portion 473-2. Unlike the first support portion 471, the second support portion 472, or the first sub-support portion 473-1, the second sub-support portion 473-2 may be a portion that is not fixed to the display 430. Accordingly, when the display 430 is deformed, the second sub-support portion 473-2 may be separated from the display 430.

In various embodiments, as illustrated in FIG. 5B, the length of the second sub-support portion 473-2 (e.g., the length in the Y-axis direction of FIG. 5B) may be smaller than other support portions (e.g., the first support portion 471, the second support portion 472, and the first sub-support portion 473-1). This may be determined in consideration of interference between the second sub-support portion 473-2 and the hinge device 500.

Meanwhile, the display 430 may be bent with a non-zero radius of curvature. Since the display 430 of which the movement is partially constrained by the support member 470 is deformed in the state of having a predetermined radius of curvature, tensile stress may occur in the display 430. In various embodiments disclosed herein, the second sub-support portion 473-2 of the third support portion 473 that supports the third area 433A may be separated from the display 430, and the second area 432A connected to the third area 433A may be supported by the second support portion 472. Due to tensile stress generated in the third area 433A when the display 430 is folded, a portion of the second region 432A may be switched from the display area 430A to the stored area 430C. In other words, while the display 430 is being folded, a portion of the display 430 may be introduced into the storage space. While the first area 431A of the display 430 is not movable by being fixed to the first support portion 471 and, the second area 432A of the display 430 may be fixed to the second support portion 472, and the second support portion 472 may be moved by being guided by the guide rail 460 which is bent in a partial section and extends to the storage space. As a portion of the second area 432A of the display 430 is introduced into the storage space while being supported by the second support portion 472, tensile stress generated in the third region 433A may be relieved. Although the stored area 430C is small or absent in the folding start state of FIG. 6C, the stored area 430C may exist as illustrated in FIGS. 6D and 6E when folding is in progress.

According to an embodiment, since the rotation shaft 530 moves during the folding of the display 430, compared to the case where the display is folded while the rotating shaft 530 is fixed, it is possible to implement natural folding without applying excessive stress to the display 430 while maintaining the radius of curvature of the display 430 at a constant level.

Figure 6E:
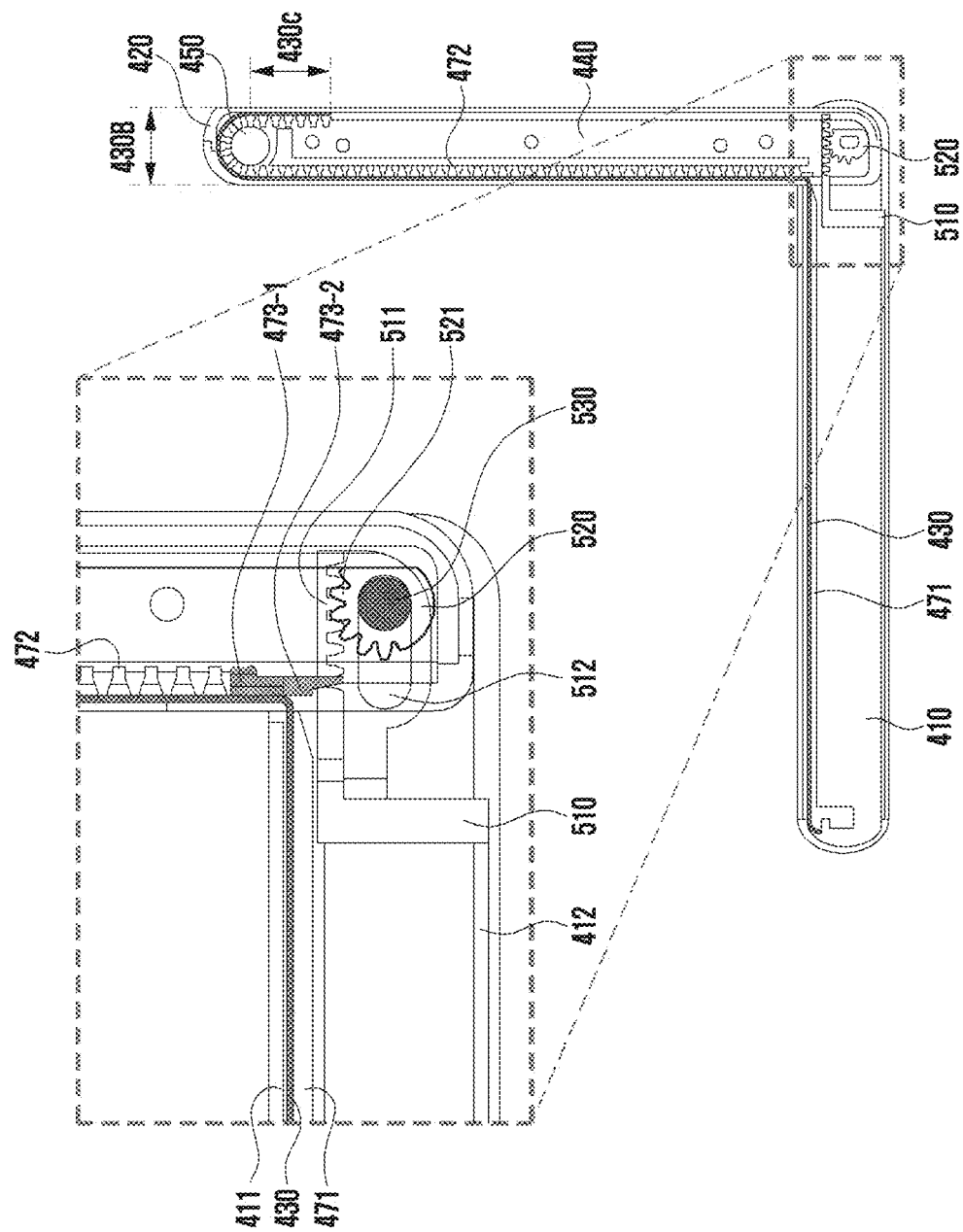

According to various embodiments, as illustrated in FIG. 6E, the second housing 420 may be folded with respect to the first housing 410 until an angle formed with the first housing 410 reaches 90 degrees. This angle is just an example, and the second housing 420 and the first housing 410 may be folded at various angles.

Next, the operation of rotating the second housing 420 with respect to the first housing 410 in a second rotation direction will be described. The second rotation direction may refer, for example, to a direction in which the second housing 420 rotates such that the first housing 410 and the second housing 420 are unfolded.

The second housing 420 may rotate with respect to the first housing 410, the second hinge 520 may rotate with respect to the first hinge 510, and as a result, the rotation shaft 530 may move in the second direction. When the rotation is in progress, the third support portion 473 may approach the first support portion 471. Referring to FIG. 6C, a first acting portion 4711 and a first inclined portion 4712 may be provided at the distal end of the first support portion 471 adjacent to the third support portion 473. The first acting portion 4711 may be perpendicular to the first direction, and the first inclined portion 4712 may be inclined with respect to the first direction. In addition, a second acting portion 473-21 corresponding to the first acting portion 4711 and a second inclined portion 473-22 corresponding to the first inclined portion 4712 may be provided at the distal end of the second sup-support portion 473-2 of the third support portion 473 adjacent to the first support portion 471. The second acting portion 473-21 may be perpendicular to the first direction, and the second inclined portion 473-22 may be inclined with respect to the first direction. When the third support portion 473 approaches the first support portion 471, the first inclined portion 4712 and the second inclined portion 473-22 may start to come into contact with each other. Since the first inclined portion 4712 and the second inclined portion 473-22 are inclined with respect to the first direction and provided to correspond to each other, the second inclined portion 473-22 may naturally cover the first inclined portion 4712. As illustrated in FIG. 6C, when the folding in the second rotation direction is completed, the second inclined portion 473-22 may completely cover the first inclined portion 4712, and the first acting portion 4711 and the second acting portion 473-21 may be engaged with each other while facing each other. In this state, when the second housing 420 is slid in the second direction, the first acting portion 4711 pushes the second acting portion 473-21, so that the first support portion 471 may press the third support portion 473 in the second direction. Accordingly, the third support portion 473 may press the second support portion 472 in the second direction, and the display 430 fixed to the second support portion 472 may be introduced into the accommodation space.

Meanwhile, a portion of the first support portion 471 may be inserted into the guide rail 460 while rotating in the second rotation direction. As illustrated in FIG. 5B (see 460A in FIG. 5B), since the guide rail 460 is configured in a partially cut shape, even if the guide rail 460 and the first support portion 471 are somewhat poorly aligned, the first support portion 471 may be normally inserted into the guide rail 460. When a portion of the guide rail 460 is cut as described above, the width (e.g., the length in the X-axis direction in FIG. 5) of the third support portion 473 may be configured to be larger than the width (e.g., the length in the X-axis direction in FIG. 5B) of multiple bars included in the second support portion 472. In the course of folding the electronic device 400, at least a portion of the first sub-support portion 473-1 needs to be maintained in the state of being inserted into the guide rail 460. This is because when the first sub-support portion 473-1 is separated from the guide rail 460 in the course of folding the electronic device, the display 430 may not be smoothly introduced into the storage space in the course of folding the electronic device.

When the width of the first sub-support portion 473-1 is increased, even though the partially cut portion 460A exists in the guide rail 460, a portion of the first sub-support portion 473-1 may maintain the state of being inserted into the guide rail 460. Thus, the operation in which the display 430 is introduced into the storage space may be normally performed in the course of folding the electronic device.

Figure 7A:
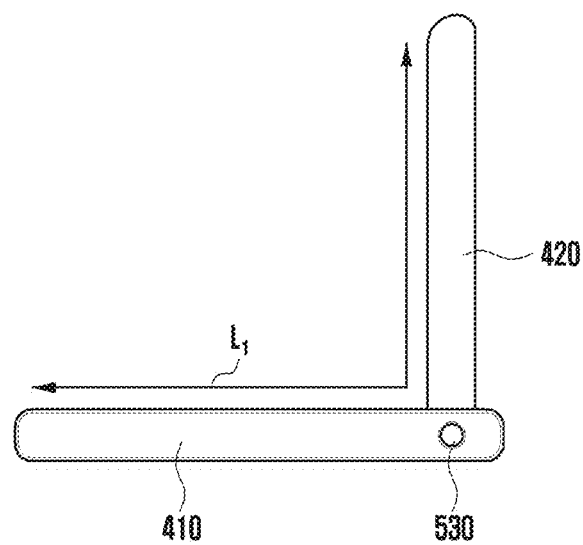
FIGS. 7A and 7B are diagrams illustrating, in comparison, an electronic device configured such that a rotation shaft is fixed and an electronic device configured such that a rotation shaft is movable as in an electronic device according to various embodiments.
Figure 7B:
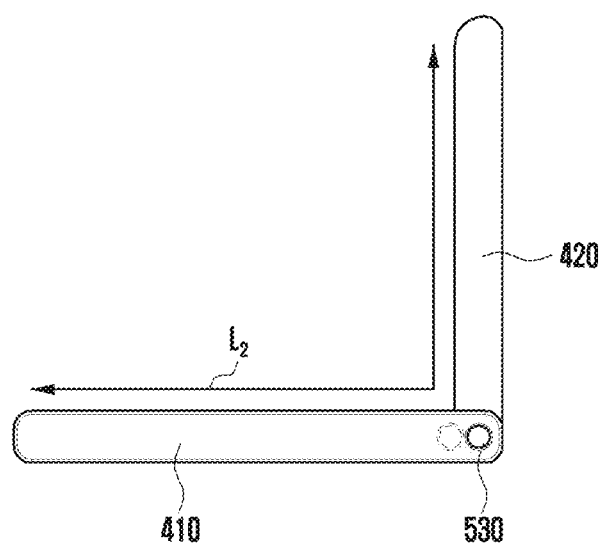

FIGS. 7A and 7B are diagrams illustrating, in comparison, an electronic device configured such that a rotation shaft is fixed and an electronic device configured such that a rotation shaft is movable as in an electronic device according to various embodiments.

In the case of an electronic device according to various embodiments disclosed herein, the rotation shaft 530 is movable in the course of folding the electronic device. For example, as described above with reference to FIG. 5B and FIGS. 6C, 6D and 6E, by the interlocking of the first gear 511 of the first hinge 510 and the second gear 512 of the second hinge 520, the rotation shaft 530 may move while the second hinge 520 is rotating with respect to the first hinge 510.

FIG. 7A illustrates a case in which an electronic device having a fixed rotation shaft 530 is folded, and FIG. 7B illustrates a case in which an electronic device configured such that a rotation shaft 530 is movable as in an electronic device of various embodiments disclosed herein is folded. The distance $L_2$ between the distal end of the first housing 410 and the distal end of the second housing 420 in FIG. 7B is larger than the distance $L_1$ between the distal end of the first housing 410 and the distal end of the second housing 420 in FIG. 7A. Through this, it can be seen that when the rotation shaft 530 is configured to be movable, it is possible to secure a larger information display area (e.g., the information display area 401A in FIG. 4A) of the display.

Figure 8A:
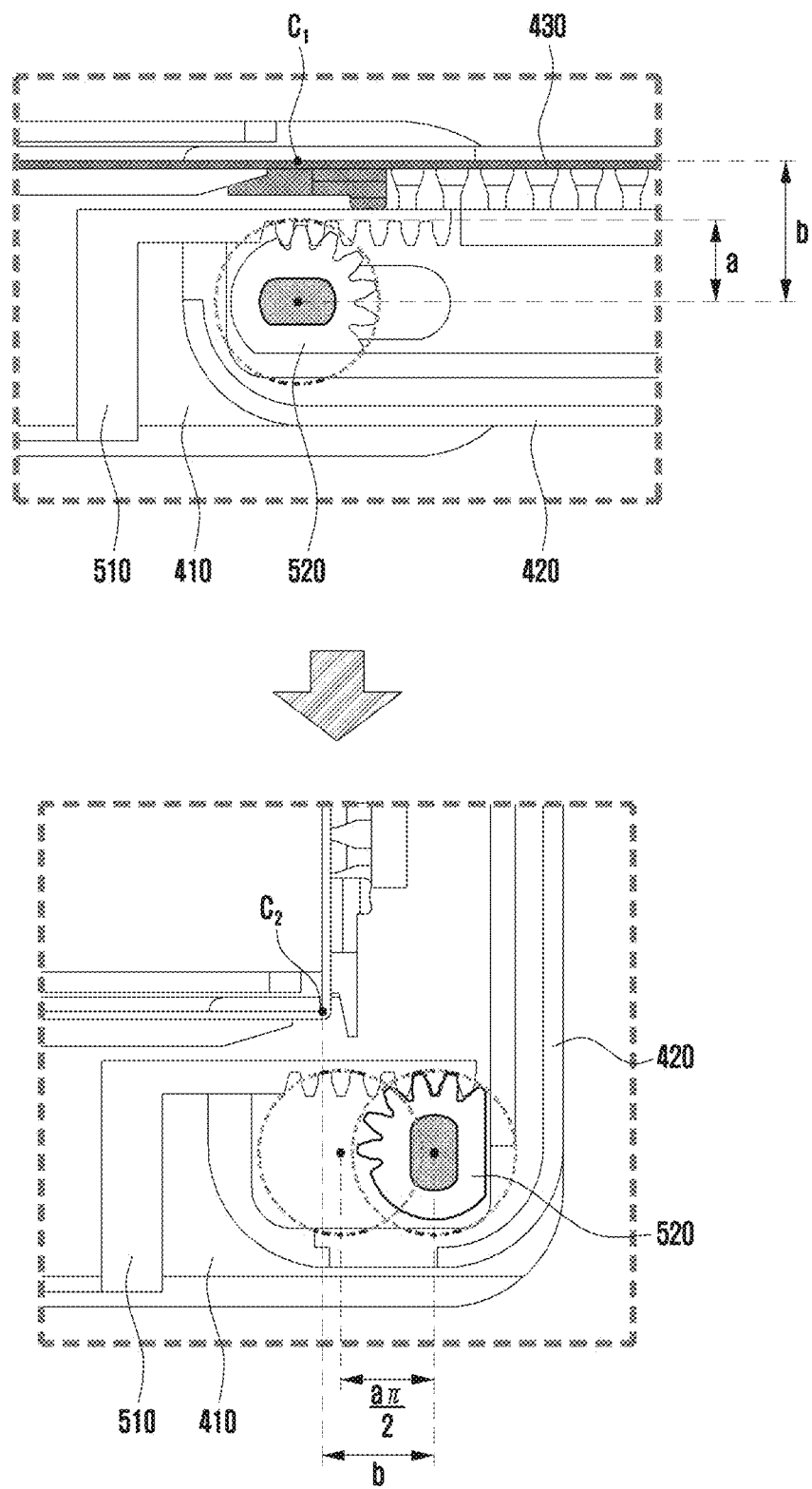
FIG. 8A is a diagram illustrating an example method of determining a distance between a first hinge and a display of an electronic device according to various embodiments.
Figure 8B:
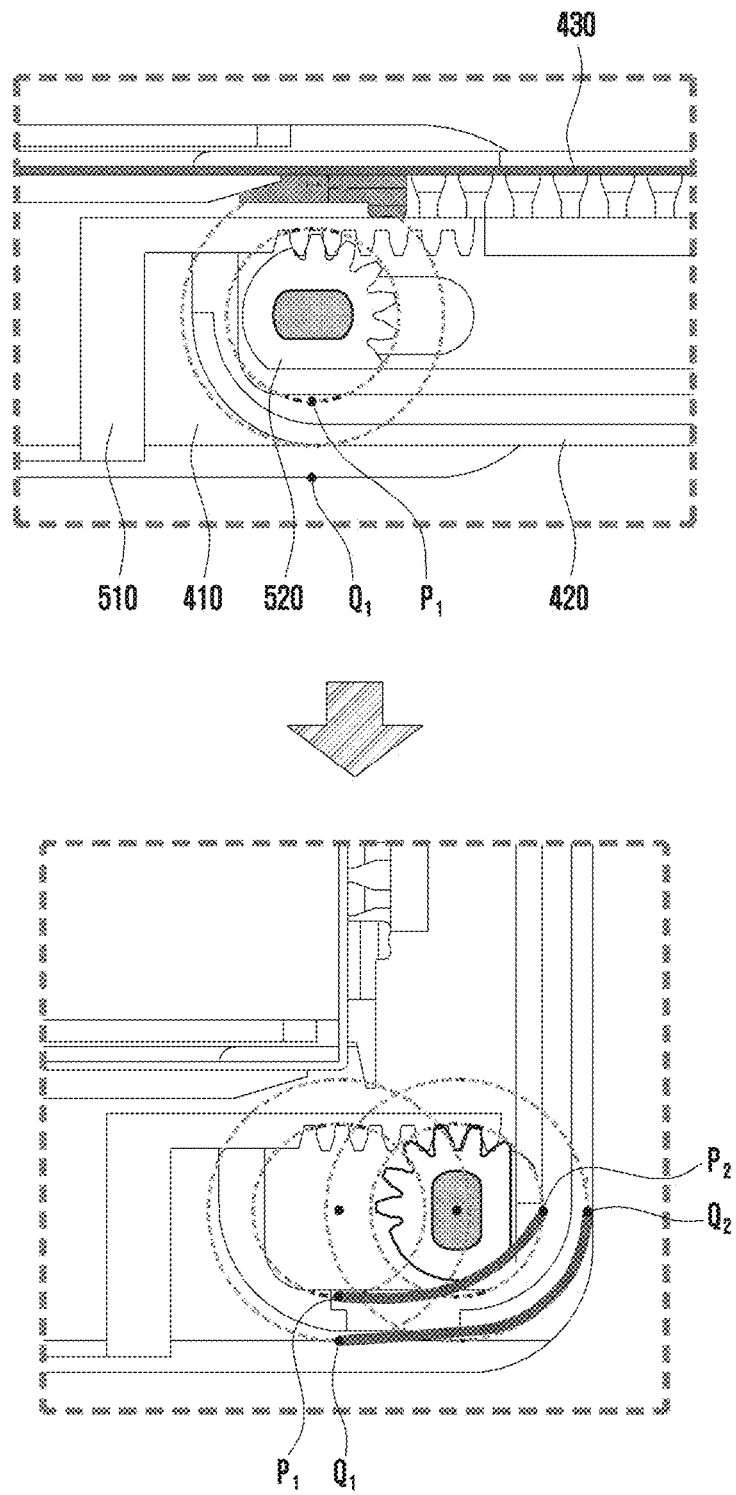
FIG. 8B is a diagram illustrating an example method of determining a cross-sectional shape of a second housing according to various embodiments.

FIG. 8A is a diagram illustrating an example method of determining a distance between a first hinge and a display of an electronic device according to various embodiments. FIG. 8B is a diagram illustrating a method of determining a cross-sectional shape of a second housing according to various embodiments.

In an embodiment, in consideration of the relationship between the radius of the second hinge 520 and the distance between the rotation shaft 530 and the display 430 to enable stable folding of the electronic device, the shape of the second hinge 520 and the distance between the rotation shaft 530 and the display 430 may be determined.

For example, referring to FIG. 8A, while the electronic device is being folded by 90 degrees, the rotation shaft 530 may move by ¼ of the diameter of the second hinge 520. Assuming that the radius of the second hinge 520 is a, the movement distance of the rotation shaft 530 may be expressed as $a\pi$. Assuming that the distance from a point where deformation of the display 430 occurs to the rotation shaft is b, the shape of the second hinge 520 and the distance from the rotation shaft 530 to the display 430 may be determined to satisfy $a\pi=b$. In this case, the acting point $C_1$ of the display 430 at the start of folding coincides with the acting point $C_2$ of the display 430 at the time of 90-degree folding, so that a stable folding operation may be possible.

In an embodiment, a cross-sectional shape of the second housing 420 may be determined such that engaging portions of the first housing 410 and the second housing 420 can be maintained in close contact with each other in the course of folding. The cross-sectional shape of the second housing 420 may be determined in consideration of the movement trajectory of the second hinge 520 during the folding.

For example, referring to FIG. 8B, before the electronic device is folded, it is assumed that a point in a contact portion between the first housing 410 and the second housing 420 is $Q_1$, and a point corresponding to $Q_1$ after the electronic device is folded by 90 degrees is $Q_2$. In addition, it is assumed that a point located vertically above $Q_1$ in the radius of the second hinge 520 before the electronic device is folded is $P_1$, and a point corresponding to $P_1$ after the electronic device is folded by 90 degrees is $P_2$. While $P_1$ moves to the point $P_2$, the trajectory may appear as a cycloid curve $P_1$-$P_2$. When the cycloid curve $P_1$-$P_2$ obtained by offsetting the cycloid curve $Q_1$-$Q_2$ by the distance between $Q_1$ and $P_1$ is determined as the cross-sectional shape of the second hinge 520, the first housing 410 and the second housing may be maintained in the close contact state while the electronic device is being folded.

An example embodiment of an electronic device disclosed herein will be described. The electronic device illustrated in FIG. 9 and FIGS. 10A, 10B and 10C may be a slidable and foldable electronic device similar to the electronic device described above with reference to FIGS. 5A and 5B. In the following description, components substantially the same as those described above will be described while being denoted by the same reference numbers.

Figure 9:
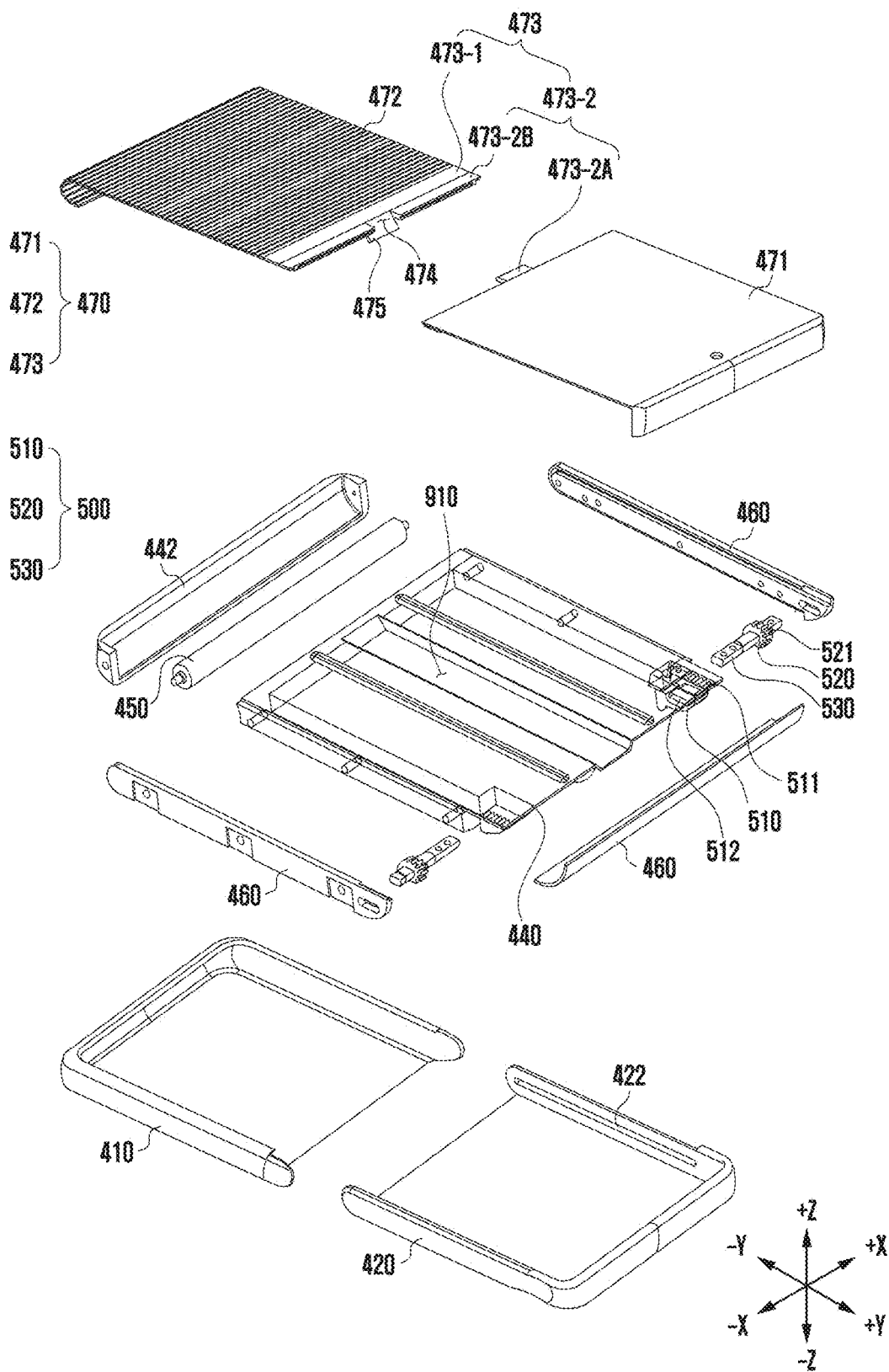
FIG. 9 is an exploded perspective view of an electronic device according to various embodiments.

FIG. 9 is an exploded perspective view of an electronic device according to various embodiments.

Referring to FIG. 9, an electronic device may include a first housing 410, a second housing 420, a sub-housing 440, a guide rail 460, a roller 450, a hinge device 500, and a support member 470.

According to various embodiments, the second housing 420 may be slidably coupled to the first housing 410. The sub-housing 440 may be coupled to the second housing 410 to support the support member 470. The sub-housing 440 may include a first cover 441 and a second cover 442. In an embodiment, the roller 450 may be disposed between the second cover 442 and the sub-housing 440. In addition, a portion of a display (e.g., the display 430 in FIG. 4A) may be stored in a storage space defined between the sub-housing 440 and the first housing 410. The guide rail 460 may guide the movement of the support member 470 while the second housing 420 is sliding with respect to the first housing 410. As illustrated in FIG. 9, the guide rail 460 may be separately configured and disposed on a side surface of the sub-housing 440 or an inner side surface of the second housing 410. In various embodiments, the guide rail 460 may be configured on a side surface of the sub-housing 440 or an inner side surface of the second housing 410. The roller 450 may support the support member 470 supporting the bending area of the display 430 (e.g., the bending area 430B in FIG. 6A). The hinge device 500 may be a component that implements the rotation of the first housing 410 relative to the second housing 420.

According to various embodiments, the hinge device 500 may include a first hinge 510, a second hinge 520, and a rotation shaft 530.

The first hinge 510 may be provided in the sub-housing 440. Since the sub-housing 440 is fixed to the first housing 410, the first hinge 510 provided in the sub-housing 440 may be fixed independent of sliding of the second housing 420 relative to the first housing 410. The first hinge 510 may include a first gear 511 and an accommodation portion 512. The first gear 511 may extend in the sliding direction of the second housing 420 (e.g., the X-axis direction in FIG. 9). The rotation shaft 530 may be inserted into the accommodation portion 512. The accommodation portion 512 may extend in the sliding direction such that the rotation shaft 530 can move in the sliding direction while the first hinge 510 is rotating with respect to the second hinge 520. Referring to FIG. 9, the accommodation portion 512 into which the rotation shaft 530 is inserted may also be provided in the guide rail 460. The rotation shaft 530 may be disposed in the state of being inserted into both the accommodation portion 512 provided in the sub-housing 440 and the rotation shaft 530 provided in the guide rail 460.

In an embodiment, the second hinge 520 may be coupled to the rotation shaft 530. The second hinge 520 may be configured separately from the rotation shaft 530 and be coupled to the rotation shaft 530 or may be configured integrally with the second hinge 520. The second hinge 520 may include a second gear 521. The second gear 521 of the second hinge 520 may be meshed with the first gear 511 of the first hinge 510.

In an embodiment, the rotation shaft 530 may be inserted into the hinge guide 422 provided on an inner side surface of the second housing 420 via the accommodation portion 512 provided in the guide rail 460. The sliding of the second housing 420 relative to the first housing 410 may be performed until the rotation shaft 530 is engaged with the hinge guide 422. Since the second housing 420 is not movable with respect to the first hinge 510 fixed to the first housing 410 in the state in which the rotation shaft 530 is engaged with the hinge guide 422, the sliding of the second housing 420 relative to the first housing 410 may no longer be performed.

According to various embodiments, the support member may include a first support portion 471, a second support portion 472, and a third support portion 473.

In an embodiment, the first support portion 471 may support a portion of the display 430 where deformation does not occur. The first support portion 471 may have a plate shape. The display 430 and the first support portion 471 may be fixed via a fixing member (not illustrated). For example, the fixing member may be an adhesive material.

In an embodiment, the second support portion 472 may support a portion of the display 430 where deformation occurs. The second support portion 472 may be configured to be bendable so as to support the area of the display 430 where deformation occurs. For example, the second support portion 472 may include multiple bars which extend in the width direction of the display 430 (e.g., the Y-axis direction in FIG. 9) and is arranged in the length direction of the display 430 (e.g., the X-axis direction in FIG. 9). Each of the multiple bars may be fixed to the display 430 via a fixing member (not illustrated). For example, the fixing member may be an adhesive material. The movement of the second support portion 472 may be guided by the guide rail 460.

In an embodiment, the third support portion 473 may be disposed between the first support portion 471 and the second support portion 472. The third support portion may include a first sub-support portion 473-1, which is fixed to the display 430, and a second sub-support portion 473-2, which is not fixed to the display. In an embodiment, the second sub-support portion 473-2 may include a first portion 473-2A, which protrudes from the first support portion 471, and a second portion 473, which protrudes from the first sub-support portion 473-2B. Both the first portion 473-2A and the second portion 473-2B may not be fixed to the display 430. In various embodiments, as illustrated in FIG. 9, the first portion 473-2A may be provided in an intermediate portion of the first support portion 471. A support groove 474 may be provided in a portion of the second portion 473-2B facing (or corresponding to) the first portion 473-2A. In addition, an inclined support portion 475 protruding obliquely in a first direction (e.g., the +X direction in FIG. 9) may be included in a portion of the first sub-support portion 473-1 corresponding to the support groove 474. Therefore, when the first support portion 471 approaches the third support portion 473, the first portion 473-2A provided on the first support portion 471 may approach the inclined support portion 475 provided on the first sub-support portion 473-1. The first portion 473-2A may press the inclined support portion 475 in the course of folding the electronic device. When the first portion 473-2A presses the inclined support portion 475, the first sub-support portion 473-1 including the inclined support portion 475 may be pressed, and the first sub-support portion 473-1 may press the second sub-support portion 473-1.

In an embodiment, the sub-housing 440 may include an inclined support portion accommodation groove 910 configured to accommodate the inclined support portion 475 moving according to the sliding of the second housing 420 relative to the first housing 410.

The electronic device illustrated in FIG. 9 is similar to the electronic device illustrated in FIG. 5A in sliding operation, except that the display is fixed to the second housing 420 and the stored area in which the display is partially stored is located between the first housing 410 and the sub-housing 440. Therefore, for a description of the sliding operation of the electronic device, the description made with reference to FIGS. 6A to 6C may be referred to.

Figure 10A:
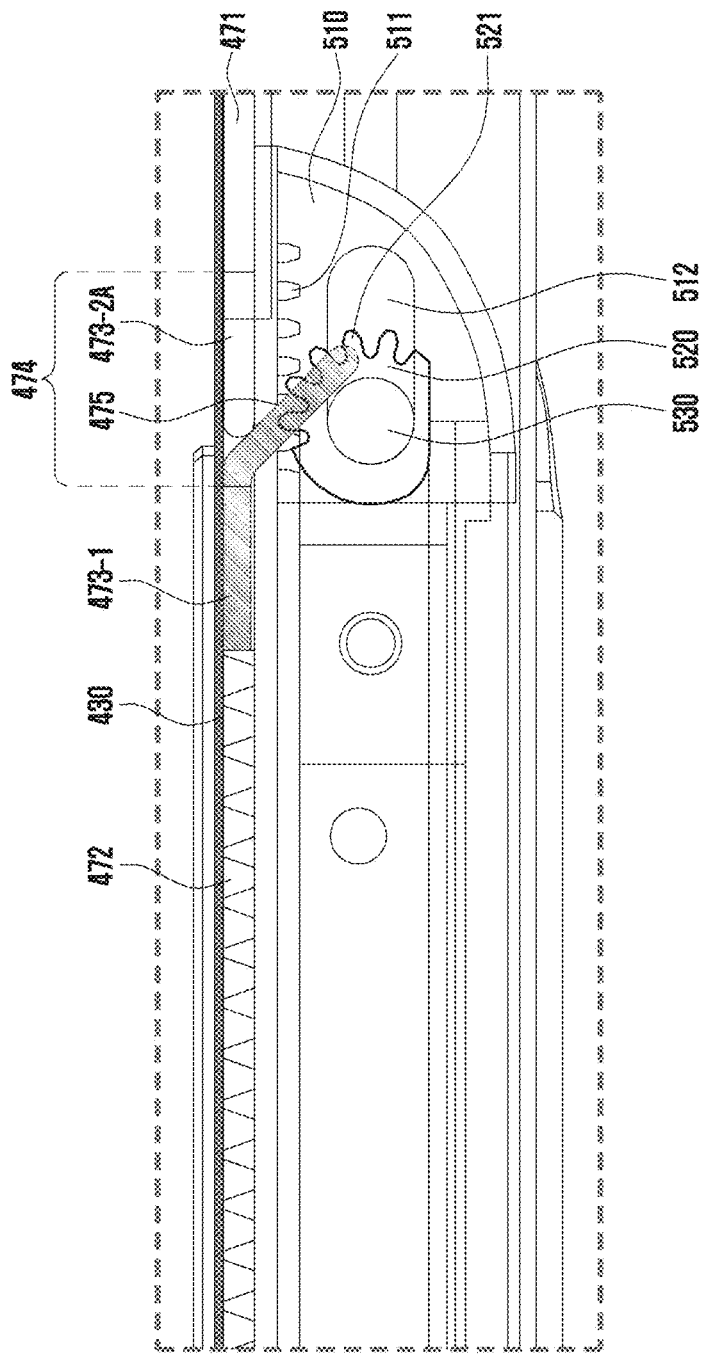
FIGS. 10A, 10B and 10C are various cross-sectional views illustrating operations of a hinge device while an electronic device according to various embodiments.
Figure 10B:
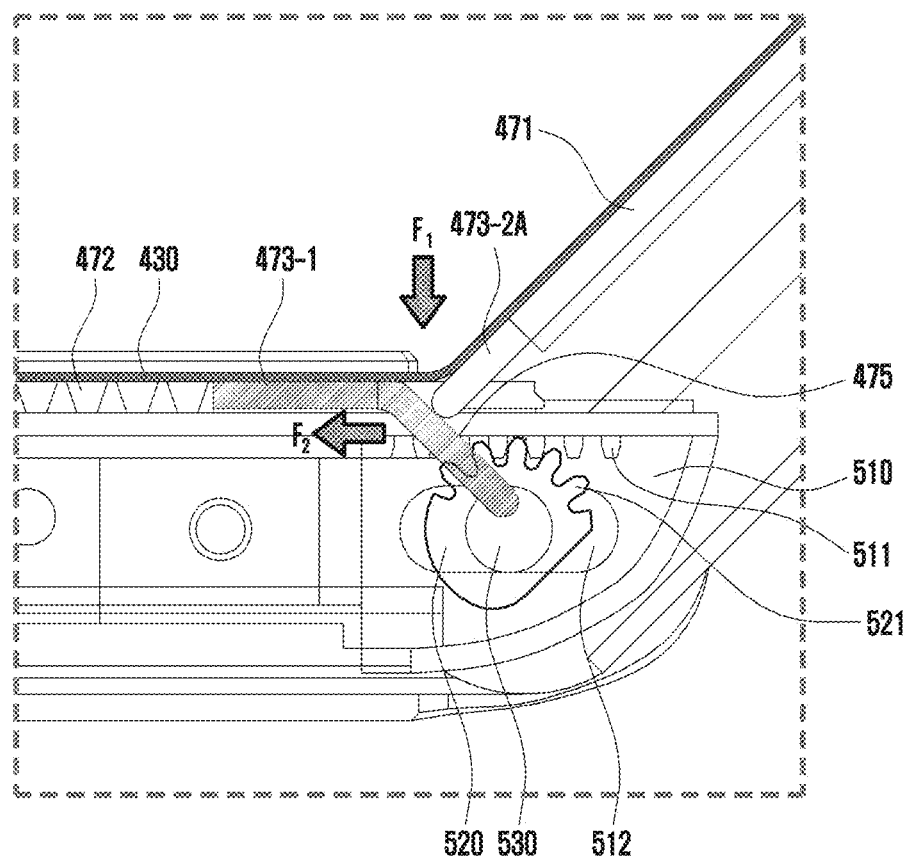
Figure 10C:
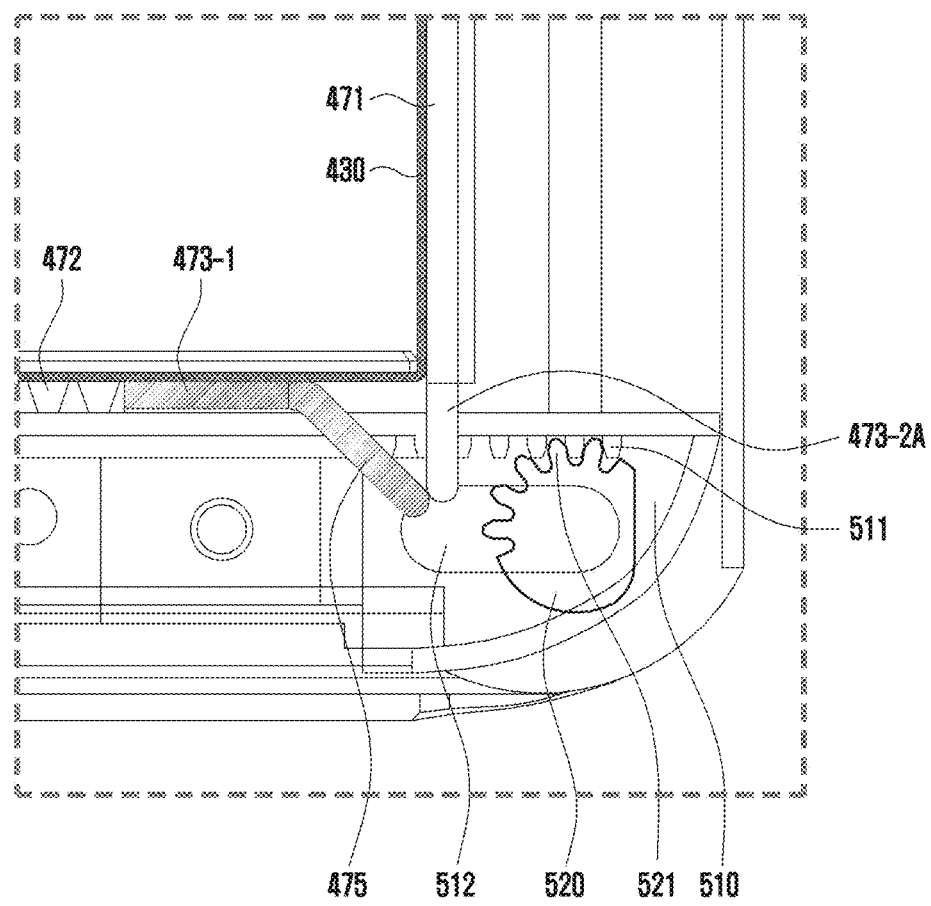

FIGS. 10A, 10B and 10C are cross-sectional views illustrating operations of a hinge device 500 while an electronic device is being folded according to various embodiments. Since the folding of the electronic device is similar to the electronic device described with reference to FIG. 5A, the overall appearance may be referred to FIGS. 6C and 6E.

When the second housing 420 rotates with respect to the first housing 410, the second hinge 520 may rotate with respect to the first hinge 510. At this time, the rotation shaft 530 may move due to interlocking of the first gear 511 and the second gear 521.

As illustrated in FIG. 10A, before the electronic device is in the folding state, the first portion 473-2A of the second sub-support portion 473-2 may be in the state of being inserted into the support groove 474 in the second portion 473-2B. In this state, the first portion 473-2A may overlap the inclined support portion 475. When the folding starts, the first portion 473-2A may press the inclined support portion 475. When the first support portion 471 rotates by folding, the first portion 473-2A protruding from the first support portion 471 may press the inclined support portion 475. As illustrated in FIGS. 10B and 10C, the first portion 473-2A may be separated from the display 430. When the first portion 473-2A presses (F1) the inclined support portion 475, the inclined support portion 475 may press (F2) the second support portion 472 due to the shape of the inclined support portion 475. The second support portion 472 may move along the guide rail 460, and the display 430 fixed to the second support portion 472 may move. The stored area of the display 430 may be increased by the movement of the second support portion 472 (see the increase in the stored area 430C in FIGS. 6D and 6E). In other words, while the display 430 is being folded, a portion of the display 430 may be introduced into the storage space. The second support portion 472 may move while being guided by the guide rail 460, which is bent in a partial section and extends into the storage space. As a portion of the display 430 is introduced into the storage space while being supported by the second support portion 472, tensile stress generated by deformation of the display 430 may be retrieved.

According to an example embodiment, an electronic device (e.g., the electronic device 400 in FIG. 4A) disclosed herein may include: a first housing (e.g., the first housing 410 in FIG. 4B), a second housing (e.g., the second housing 420 in FIG. 4B) coupled to the first housing to be slidable in a first direction, a flexible display (e.g., the display 430 in FIG. 4B) having one end fixed to one of the first housing and the second housing such that an information display area, including a portion visible from the outside of the electronic device, is configured to increase and/or decrease based on sliding of the second housing, and a hinge device including a hinge (e.g., the hinge device 500 in FIG. 5B) configured to rotatably connect the second housing to the first housing. A rotation shaft (e.g., the rotation shaft 530 in FIG. 5B) of the hinge device may be inserted into an accommodation portion (e.g., the accommodation portion 512 in FIG. 5B), extending in the first direction, to be movable in the first direction during the rotation of the second housing relative to the first housing.

In addition, according to an example embodiment, the hinge device may include a first hinge (e.g., the first hinge 510 in FIG. 5B) in which the accommodation portion is formed, and a second hinge (e.g., the second hinge 520 in FIG. 5B) connected to the first hinge to be rotatable with respect to the first hinge.

In addition, according to an example embodiment, the hinge device may include a structure in which a first gear (e.g., the first gear 511 in FIG. 5B) provided in the first hinge and a second gear (e.g., the first gear 521 in FIG. 5B) provided in the second hinge of the hinge device are meshed with each other, and when the second gear is meshed and rotated, the rotation shaft may move in the first direction.

In addition, according to an example embodiment, at least one of the first gear and the second gear may include a gear extending in the first direction.

In addition, according to an example embodiment, the first gear may include a rack gear, and the second gear may include a pinion gear.

In addition, according to an example embodiment, the display may include a display area (e.g., the display area 430A in FIG. 6A) visible from the outside of the electronic device, a stored area inside the electronic device (e.g., the stored area 430C in FIG. 6A), and a bending area (e.g., the bending area 430B in FIG. 6A) interconnecting the display area and the stored area and is configured to be bent.

In addition, according to an example embodiment, the electronic device may further include a support (e.g., the support member 470 in FIG. 5A) configured to support the display, wherein the support may include a first support portion (e.g., the first support portion 471 in FIG. 5A) configured to support a first area of the display area, a second support portion (e.g., the second support portion 472 in FIG. 5A) configured to support a second area of the display area, the bending area of the display, and the stored area of the display, and a third support portion (e.g., the third support portion 473 in FIG. 5A) configured to support at least a portion of the third area interconnecting the first area of the display area and the second area of the display area.

In addition, according to an example embodiment, the second support portion may include a plurality of bars extending in a width direction of the display and arranged in a length direction of the display perpendicular to the width direction.

In addition, according to an example embodiment, the first support portion and the second support portion of the support may be fixed to the display, and the third support portion of the support may include a first sub-support portion (e.g., the first sub-support portion 473-1 in FIG. 5B) fixed to the display and a second sub-support portion (e.g., wherein the second sub-support portion 473-2 in FIG. 5B) is separated from the display.

In addition, according to an example embodiment, the hinge device may be configured such that the first hinge and the second hinge move together depending on the sliding of the second housing, and the sliding of the first hinge may be restricted by a hinge guide (e.g., the hinge guide 412 in FIG. 5B) provided in the first housing and the second housing may be rotated relative to the first housing by rotating the second hinge relative to the first housing in a state in which the sliding of the first hinge is restricted.

In addition, according to an example embodiment, the electronic device may further include a sub-housing (e.g., the sub-housing 440 in FIG. 5A) coupled to the second housing, and the stored area of the display may be an area where the display is configured to be stored in a storage space defined by the second housing and the sub-housing.

In addition, according to an example embodiment, the electronic device may further include a guide rail (e.g., the guide rail 460 in FIG. 5A) configured to guide the movement of the support, wherein the guide rail may be at least partially bent and may extend into the accommodation space.

In addition, according to an example embodiment, the first support portion may include a first acting portion (e.g., the first acting portion 4711 in FIG. 6C) provided at a distal end adjacent to the third support portion to be perpendicular to the first direction, and a first inclined portion (e.g., the first inclined portion 4712 in FIG. 6C) provided to be inclined with respect to the first direction, and the second sub-support portion of the third support portion may include a second acting portion (e.g., the second acting portion 473-21 of FIG. 6C) provided at a distal end adjacent to the first support portion to correspond to the first acting portion, and a second inclined portion (e.g., the second inclined portion 473-22 in FIG. 6C) provided to correspond to the first inclined portion.

In addition, according to an example embodiment, in the hinge device, the first hinge (e.g., the first hinge 510 in FIG. 9) may be disposed at a fixed position with respect to the first housing, based on the hinge guide formed in the second housing (e.g., the hinge guide 422 in FIG. 9) and the second hinge (e.g., the second hinge 420 in FIG. 9) at least partially inserted into the hinge guide being engaged with each other, the sliding of the second housing relative to the second hinge may be restricted, and based on the second hinge rotating with respect to the first hinge in the state in which the sliding of the second housing is restricted, the second housing may be configured to rotate with respect to the first housing.

In addition, according to an example embodiment, the second sub-support portion of the third support portion may include a first portion (e.g., the first portion 473-2A in FIG. 9) protruding from the first support portion and a second portion (e.g., the second portion 473-2B in FIG. 9) including a support groove (e.g., the support groove 474 in FIG. 9) corresponding to the first portion.

In addition, according to an example embodiment, the second portion may be configured integrally on the first sub-support portion of the third support portion.

In addition, according to an example embodiment, the second portion may include an inclined support portion provided in a portion corresponding to the support groove protruding from the first sub-support portion in a direction inclined with respect to the first direction.

In addition, according to an example embodiment, the electronic device may further include a sub-housing coupled to the first housing, wherein the sub-housing may further include an inclined support portion accommodation groove (e.g., the inclined support portion accommodation groove 910 in FIG. 9) extending in the first direction configured to accommodate the inclined support portion (e.g., the inclined support portion 475 in FIG. 9) moving in the first direction based on the sliding of the second housing.

In addition, according to an example embodiment, the electronic device may further include a sub-housing coupled to the first housing, wherein the stored area of the display may include an area where the display is stored in a storage space defined by the second housing and the sub-housing.

In addition, according to an example embodiment, the electronic device may further include a guide rail configured to guide the movement of the support, wherein the guide rail may be at least partially bent and extend into the accommodation space.

The various example embodiments and drawings are provided merely to easily describe the technical features according to the various example embodiments disclosed herein and to aid in understanding of the disclosure and are not intended to limit the scope of the disclosure. Therefore, the scope of the various embodiments disclosed herein should be understood as including, in addition to the various example embodiments disclosed herein, all changes or modifications derived based on the disclosure and the various example embodiments disclosed herein, including the appended claims and their equivalents. It will also be understood that any of the embodiment(s) described herein may be used in conjunction with any other embodiment(s) described herein.

What is claimed is:

1. An electronic device comprising:
   a first housing;
   a second housing coupled to the first housing and configured to be movable in a first direction;
   a flexible display disposed on the first housing and the second housing, at least a portion of the flexible display being drawn into or withdrawn from an internal space of the electronic device in accordance with the second housing moving with respect to the first housing; and
   a hinge device including a hinge configured to rotatably connect the second housing to the first housing,
   wherein a rotation shaft of the hinge device is inserted into an accommodation portion extending in the first direction, and wherein the hinge device is configured to linearly displace the rotation shaft in the first direction during rotation of the second housing relative to the first housing, and
   wherein the first direction is a direction perpendicular to an extending direction of the rotation shaft.

2. The electronic device of claim 1, wherein the hinge device comprises:
   a first hinge in which the accommodation portion is provided; and
   a second hinge connected to the first hinge and configured to be rotatable with respect to the first hinge.

3. The electronic device of claim 2, wherein the hinge device comprises a structure in which a first gear provided in the first hinge and a second gear provided in the second hinge of the hinge device are meshed with each other, and
   wherein, based on the second gear being meshed and rotated, the rotation shaft is configured to move in the first direction.

4. The electronic device of claim 3, wherein at least one of the first gear and the second gear extends in the first direction.

5. The electronic device of claim 3, wherein the first gear includes a rack gear, and the second gear includes a pinion gear.

6. The electronic device of claim 2, wherein the flexible display comprises a display area visible to the outside of the electronic device, a stored area inside the electronic device, and a bending area interconnecting the display area and the stored area and is bent.

7. The electronic device of claim 6, further comprising a support configured to support the display,
   wherein the support comprises:
   a first support portion configured to support a first area of the display area;
   a second support portion configured to support a second area of the display area, the bending area of the display; and
   a third support portion configured to support at least a portion of a third area interconnecting the first area of the display area and the second area of the display area.

8. The electronic device of claim 7, wherein the first support portion and the second support portion of the support are fixed to the display, and
   wherein the third support portion of the support comprises a first sub-support portion fixed to the flexible display and a second sub-support portion separate from the flexible display.

9. The electronic device of claim 8, wherein the hinge device is configured such that the first hinge and the second hinge move together based on the sliding of the second housing, and
   wherein the sliding of the first hinge is restricted by a hinge guide provided in the first housing, and the second housing is configured to be rotated relative to the first housing by rotating the second hinge relative to the first housing in a state in which the sliding of the first hinge is restricted.

10. The electronic device of claim 9, wherein the first support portion comprises a first acting portion at a distal end adjacent to the third support portion and perpendicular to the first direction, and a first inclined portion inclined with respect to the first direction, and
    wherein the second sub-support portion of the third support portion comprises a second acting portion at a distal end adjacent to the first support portion corresponding to the first acting portion, and a second inclined portion corresponding to the first inclined portion.

11. The electronic device of claim 8, wherein, in the hinge device, the first hinge is disposed at a fixed position with respect to the first housing,
    wherein, based on the hinge guide provided in the second housing and the second hinge at least partially inserted into the hinge guide being engaged with each other, the sliding of the second housing relative to the second hinge is restricted, and based on the second hinge rotating with respect to the first hinge in the state in which the sliding of the second housing is restricted, the second housing is configured to rotate with respect to the first housing.

12. The electronic device of claim 11, wherein the second sub-support portion of the third support portion comprises a first portion protruding from the first support portion, and a second portion comprising a support groove corresponding to the first portion.

13. The electronic device of claim 12, wherein the second portion is integrally provided on the first sub-support portion of the third support portion.

14. The electronic device of claim 12, wherein the second portion comprises an inclined support portion in a portion corresponding to the support groove protruding from the first sub-support portion in a direction inclined with respect to the first direction.

15. The electronic device of claim 14, further comprising a sub-housing coupled to the first housing,
   wherein the sub-housing may further comprise an inclined support portion accommodating groove extending in the first direction to accommodate the inclined support portion configured to move in the first direction based on sliding of the second housing.

* * * * *